(12) United States Patent
Liu et al.

(10) Patent No.: US 12,299,392 B2
(45) Date of Patent: May 13, 2025

(54) TEXT PROCESSING METHOD AND APPARATUS FOR ERROR CORRECTION OF A PLURALITY OF TYPES OF NON-WORDS AND REAL WORDS

(71) Applicant: Huawei Technologies Co., Ltd., Guangdong (CN)

(72) Inventors: Jie Liu, Shenzhen (CN); Guanwen Zhu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 239 days.

(21) Appl. No.: 17/788,052

(22) PCT Filed: Dec. 11, 2020

(86) PCT No.: PCT/CN2020/135636
§ 371 (c)(1),
(2) Date: Jun. 22, 2022

(87) PCT Pub. No.: WO2021/129411
PCT Pub. Date: Jul. 1, 2021

(65) Prior Publication Data
US 2023/0065965 A1   Mar. 2, 2023

(30) Foreign Application Priority Data
Dec. 23, 2019  (CN) .......................... 201911335070.1

(51) Int. Cl.
*G06F 40/232* (2020.01)
*G06F 40/166* (2020.01)
(Continued)

(52) U.S. Cl.
CPC .......... *G06F 40/284* (2020.01); *G06F 40/166* (2020.01); *G06F 40/40* (2020.01); *G06N 3/08* (2013.01)

(58) Field of Classification Search
CPC .... G06F 40/232; G06F 40/237; G06F 40/242; G06F 40/279; G06F 40/284
(Continued)

(56) References Cited

U.S. PATENT DOCUMENTS 10,936,813 B1\*   3/2021  Gupta ................... G06F 40/232
2003/0046263 A1\*  3/2003  Castellanos ........... G06F 16/345
(Continued)

FOREIGN PATENT DOCUMENTS

CN         101655837 A       2/2010
CN         101369285 B       6/2010
(Continued)

*Primary Examiner* — Martin Lerner
(74) *Attorney, Agent, or Firm* — WOMBLE BOND DICKINSON (US) LLP

(57) ABSTRACT

This application discloses a text processing method and apparatus in the natural language processing field in the artificial intelligence field. The method includes: obtaining a to-be-processed text; performing error detection processing on the to-be-processed text to obtain a non-word in the to-be-processed text; and if the non-word in the to-be-processed text belongs to a first type of non-word, skipping correcting the non-word in the to-be-processed text; or if the non-word in the to-be-processed text belongs to a second type of non-word, a third type of non-word, or a fourth type of non-word, selecting a correction mode matching the type of the non-word in the to-be-processed text to correct the non-word in the to-be-processed text and obtain a correction result of the non-word in the to-be-processed text. According to the technical solutions of this application, a plurality of types of character strings can be detected and filtered.

18 Claims, 12 Drawing Sheets

(51) Int. Cl.
*G06F 40/237* (2020.01)
*G06F 40/279* (2020.01)
*G06F 40/284* (2020.01)
*G06F 40/40* (2020.01)
*G06N 3/08* (2023.01)

(58) Field of Classification Search
USPC .................. 704/1, 9, 10; 715/257, 258, 259
See application file for complete search history.

(56) References Cited

U.S. PATENT DOCUMENTS

| | | | | |
|---|---|---|---|---|
| 2003/0145285 | A1* | 7/2003 | Miyahira | G06F 40/232 715/257 |
| 2004/0205672 | A1* | 10/2004 | Bates | G06F 40/143 715/256 |
| 2005/0123203 | A1* | 6/2005 | Heilper | G06V 30/268 382/229 |
| 2006/0048055 | A1* | 3/2006 | Wu | G06F 40/232 715/262 |
| 2008/0022198 | A1* | 1/2008 | King | G06F 40/232 715/257 |
| 2009/0254817 | A1* | 10/2009 | Dreyfus | G06F 40/232 715/257 |
| 2010/0063798 | A1* | 3/2010 | Ku | G06F 40/232 704/9 |
| 2010/0138210 | A1 | 6/2010 | Seo et al. | |
| 2010/0180198 | A1 | 7/2010 | Iakobashvili et al. | |
| 2011/0087695 | A1* | 4/2011 | Sharma | G06F 40/279 707/769 |
| 2014/0281943 | A1 | 9/2014 | Prilepov et al. | |
| 2015/0019207 | A1* | 1/2015 | Dou | G06F 40/232 704/9 |
| 2015/0228272 | A1* | 8/2015 | Gupta | G10L 15/14 704/235 |
| 2016/0253989 | A1* | 9/2016 | Kuo | G10L 15/183 704/257 |
| 2018/0365220 | A1* | 12/2018 | Chakraborty | G06F 40/30 |
| 2020/0356626 | A1* | 11/2020 | Cogley | G06F 40/232 |

FOREIGN PATENT DOCUMENTS

| | | |
|---|---|---|
| CN | 101847209 A | 9/2010 |
| CN | 103136196 A | 6/2013 |
| CN | 103885938 A | 6/2014 |
| CN | 105975625 A | 9/2016 |
| CN | 106202153 A | 12/2016 |
| CN | 107193921 A | 9/2017 |
| CN | 107220639 A | 9/2017 |
| CN | 107577668 A | 1/2018 |
| CN | 107633250 A | 1/2018 |
| CN | 108009546 A | 5/2018 |
| CN | 108345581 A | 7/2018 |
| CN | 109145287 A | 1/2019 |
| CN | 109582972 A | 4/2019 |
| CN | 109711412 A | 5/2019 |
| EP | 0370778 A2 | 5/1990 |
| EP | 4060526 A1 * | 9/2022 ............ G06F 16/35 |
| WO | WO-2019243486 A1 * | 12/2019 ........... G06F 40/232 |

* cited by examiner

TEXT PROCESSING METHOD AND APPARATUS FOR ERROR CORRECTION OF A PLURALITY OF TYPES OF NON-WORDS AND REAL WORDS

This application is a National Stage of International Application No. PCT/CN2020/135636, filed Dec. 11, 2020, which claims priority to Chinese Patent Application No. 201911335070.1, filed on Dec. 23, 2019, both of which are hereby incorporated by reference in their entireties.

TECHNICAL FIELD

This application relates to the natural language processing field, and more specifically, to a text processing method and apparatus.

BACKGROUND

Artificial intelligence (AI) is a theory, a method, a technology, and an application system that use a digital computer or a machine controlled by a digital computer to simulate, extend human intelligence, perceive an environment, acquire knowledge, and use the knowledge to obtain an optimal result. In other words, artificial intelligence is a branch of computer science. Artificial intelligence seeks to understand essence of intelligence and produce a new intelligent machine that can respond in a way similar to human intelligence. Artificial intelligence is to study design principles and implementation methods of various intelligent machines, so that the machines have functions of perception, reasoning, and decision making.

With continuous development of artificial intelligence technologies, a natural language man-machine interaction system that enables man-machine interaction through a natural language becomes increasingly important. Man-machine interaction through the natural language requires that the system should be capable of recognizing specific meanings of the human natural language. Usually, the system recognizes a specific meaning of a sentence by extracting key information from the sentence in the natural language.

Text error correction is to perform error detection on an original text and correct an error based on a natural language processing technology. Currently, text error correction can be usually implemented by using two methods. One method is to determine, based on a dictionary, whether input query words are correct, detect an incorrect word, and then correct the incorrect word. The other method is to extract contextual semantic information by using a language model, to correct an incorrect word. The original text may include a plurality of types of characters, but both of the foregoing methods can be used to check and correct only a single type of character. Therefore, accuracy of error correction is low.

SUMMARY

This application provides a text processing method and apparatus to detect and filter a plurality of types of characters, so that accuracy of text error correction is improved.

According to a first aspect, a text processing method is provided, including: obtaining a to-be-processed text; performing error detection processing on the to-be-processed text to obtain a non-word in the to-be-processed text; and if the non-word in the to-be-processed text belongs to a first type of non-word, using the non-word in the to-be-processed text as a correction result of the non-word in the to-be-processed text; or if the non-word in the to-be-processed text belongs to a second type of non-word, a third type of non-word, or a fourth type of non-word, selecting a correction mode matching the type of the non-word in the to-be-processed text to correct the non-word in the to-be-processed text and obtain a correction result of the non-word in the to-be-processed text, where the first type of non-word includes an all-uppercase-letter non-word, a non-word whose length is within a preset length range, and a non-word belonging to a first preset lexicon, the second type of non-word includes a compound incorrect non-word, the third type of non-word includes a non-word including a non-letter character, and the fourth type of non-word includes non-words other than the first type of non-word, the second type of non-word, and the third type of non-word.

The to-be-processed text may be an optical character recognition (OCR) output text, or may be a text input by a user. For example, the text input by the user may include content published in a social network, or may be content input in a search box of a search engine. It should be understood that the to-be-processed text may be any text on which error correction is to be performed. A specific form of the to-be-processed text is not limited in this application.

Non-word error detection may be performed on the to-be-processed text based on a second preset lexicon, to obtain a non-word in the to-be-processed text. The non-word is a word that does not exist in the second preset lexicon. The first preset lexicon is different from the second preset lexicon.

It should be understood that any lexicon that can be used to detect a non-word error may be understood as the second preset lexicon. For example, when the method 500 is applied to English text error correction, the second preset lexicon may be an English lexicon, and a non-word is a word that does not exist in the English lexicon, for example, werld.

In this embodiment of this application, a plurality of types of characters in the to-be-processed text can be separately detected and processed. In this way, interference caused by the plurality of types of characters to an error correction process is reduced, accuracy of text error correction is improved, and robustness of the error correction method for the input text is improved.

With reference to the first aspect, in some embodiments, the selecting a correction mode matching the type of the non-word in the to-be-processed text to correct the non-word in the to-be-processed text and obtain a correction result of the non-word in the to-be-processed text if the non-word in the to-be-processed text belongs to a second type of non-word, a third type of non-word, or a fourth type of non-word includes: if the non-word in the to-be-processed text belongs to the fourth type of non-word, generating candidate words corresponding to the non-word in the to-be-processed text; determining, from the candidate words corresponding to the non-word in the to-be-processed text, a target candidate word corresponding to the non-word in the to-be-processed text; and correcting the non-word in the to-be-processed text based on the target candidate word corresponding to the non-word in the to-be-processed text, to obtain the correction result of the non-word in the to-be-processed text.

There may be one or more candidate words corresponding to the non-word in the to-be-processed text.

With reference to the first aspect, in some embodiments, the determining, from the plurality of candidate words corresponding to the non-word in the to-be-processed text, a target candidate word corresponding to the non-word in the to-be-processed text includes: scoring, based on a similarity between the non-word in the to-be-processed text and a candidate word corresponding to the non-word in the to-be-processed text and perplexity of the candidate word corresponding to the non-word in the to-be-processed text, the candidate word corresponding to the non-word in the to-be-processed text, where the perplexity of the candidate word corresponding to the non-word in the to-be-processed text is used to indicate a possibility that the candidate word corresponding to the non-word in the to-be-processed text occurs in the to-be-processed text; and determining a candidate word with a highest score among the candidate words corresponding to the non-word in the to-be-processed text as the target candidate word corresponding to the non-word in the to-be-processed text.

The perplexity of the candidate word corresponding to the non-word may be scored by using a language model.

A score corresponding to each candidate word may be obtained by weighting scores corresponding to the foregoing several items, that is, a weight is set for a score corresponding to each item. The weight may be preset, or may be obtained through training.

In this embodiment of this application, the candidate word is scored by using the similarity between the candidate word and the non-word and the perplexity of the candidate word. In addition, because the similarity between the non-word and the candidate word and semantic information of the to-be-processed text are considered, an original meaning of the input text can be better fitted, a better candidate word can be obtained, and accuracy of text error correction is improved.

With reference to the first aspect, in some embodiments, the similarity between the non-word in the to-be-processed text and the candidate word corresponding to the non-word in the to-be-processed text meets a first preset condition.

For example, the similarity between the non-word in the to-be-processed text and the candidate word corresponding to the non-word in the to-be-processed text may include an editing distance and/or a common character string between the non-word in the to-be-processed text and the candidate word corresponding to the non-word in the to-be-processed text. That is, the candidate word corresponding to the non-word in the to-be-processed text may be determined based on the editing distance and/or the common character string.

The editing distance is a quantity of editing operations required to convert one word into another word. The editing operations include operations such as inserting, deleting, transposing, and replacing characters in words.

The common character string is a quantity of consecutive same characters contained in two words.

For example, the first preset condition may be that the editing distance is less than a first preset value.

With reference to the first aspect, in some embodiments, the correcting the non-word in the to-be-processed text based on the target candidate word corresponding to the non-word in the to-be-processed text, to obtain the correction result of the non-word in the to-be-processed text includes: when perplexity of the target candidate word corresponding to the non-word in the to-be-processed text is less than or equal to a first perplexity threshold, replacing the non-word in the to-be-processed text with the target candidate word corresponding to the non-word in the to-be-processed text, and using the target candidate word as the correction result of the non-word in the to-be-processed text.

In this embodiment of this application, the perplexity of the target candidate word is determined, and the non-word in the to-be-processed text is replaced with the target candidate word whose perplexity is less than or equal to the first perplexity threshold. Therefore, the semantic information of the text can be fully used, and accuracy of text error correction can be further improved.

With reference to the first aspect, in some embodiments, the compound incorrect non-word is a non-word including at least two real words; and the selecting a correction mode matching the type of the non-word in the to-be-processed text to correct the non-word in the to-be-processed text and obtain a correction result of the non-word in the to-be-processed text if the non-word in the to-be-processed text belongs to a second type of non-word, a third type of non-word, or a fourth type of non-word includes: if the non-word in the to-be-processed text belongs to the second type of non-word, correcting the non-word in the to-be-processed text to obtain the at least two real words, and using the at least two real words as the correction result of the non-word in the to-be-processed text.

For example, a space may be added in an appropriate position in the non-word to modify the non-word into at least two real words.

For example, the non-word in the to-be-processed text is in China, the non-word belongs to the second type of non-word, and a space is added to the non-word to modify the non-word into "in China".

With reference to the first aspect, in some embodiments, modified at least two real words are input into the language model, and if the modified at least two real words can reduce the perplexity, the modified at least two real words are used as the correction result of the non-word in the to-be-processed text.

In this embodiment of this application, the perplexity of the modified at least two real words is further determined by using the language model, and the semantic information of the to-be-processed text is used. Therefore, the original meaning of the input text can be better fitted, a better candidate word can be obtained, and accuracy of text error correction is improved.

With reference to the first aspect, in some embodiments, the selecting a correction mode matching the type of the non-word in the to-be-processed text to correct the non-word in the to-be-processed text and obtain a correction result of the non-word in the to-be-processed text if the non-word in the to-be-processed text belongs to a second type of non-word, a third type of non-word, or a fourth type of non-word includes: if the non-word in the to-be-processed text belongs to the third type of non-word, modifying a non-letter character in the non-word in the to-be-processed text to a letter, and using a modified word as the correction result of the non-word in the to-be-processed text.

With reference to the first aspect, in some embodiments, the modified word is input into the language model, and if the modified word can reduce the perplexity, the modified word is used as the correction result of the non-word in the to-be-processed text.

In this embodiment of this application, the perplexity of the modified word is further determined by using the language model, and the semantic information of the to-be-processed text is used. Therefore, the original meaning of the input text can be better fitted, a better candidate word can be obtained, and accuracy of text error correction is improved.

With reference to the first aspect, in some embodiments, the method further includes: performing real-word error detection on the to-be-processed text to obtain an incorrect real word in the to-be-processed text; generating candidate words corresponding to the incorrect real word; determining, from the candidate words corresponding to the incorrect real word, a target candidate word corresponding to the incorrect real word; and correcting the incorrect real word based on the target candidate word corresponding to the incorrect real word.

For example, real-word error detection may be performed on the to-be-processed text based on the language model, to obtain the incorrect real word in the to-be-processed text.

For example, the language model may be a statistical language model. For another example, the language model may alternatively be a neural network model.

There may be one or more candidate words corresponding to the incorrect real word.

With reference to the first aspect, in some embodiments, the determining, from the candidate words corresponding to the incorrect real word, a target candidate word corresponding to the incorrect real word includes: scoring, based on a similarity between the incorrect real word and a candidate word corresponding to the incorrect real word and perplexity of the candidate word corresponding to the incorrect real word, the candidate word corresponding to the incorrect real word, where the perplexity of the candidate word corresponding to the incorrect real word is used to indicate a possibility that the candidate word corresponding to the incorrect real word occurs in the to-be-processed text; and determining a candidate word with a highest score among the candidate words corresponding to the incorrect real word as the target candidate word corresponding to the incorrect real word.

The perplexity of the candidate word corresponding to the incorrect real word may be scored by using the language model.

A score corresponding to each candidate word may be obtained by weighting scores corresponding to the foregoing several items, that is, a weight is set for a score corresponding to each item. The weight may be preset, or may be obtained through training.

In this embodiment of this application, the candidate word is scored by using the similarity between the candidate word and the incorrect real word and the perplexity of the candidate word. In addition, because the similarity between the incorrect real word and the candidate word and the semantic information of the to-be-processed text are considered, the original meaning of the input text can be better fitted, a better candidate word can be obtained, and accuracy of text error correction is improved.

With reference to the first aspect, in some embodiments, the similarity between the incorrect real word in the to-be-processed text and the candidate word corresponding to the incorrect real word in the to-be-processed text meets a second preset condition.

For example, the similarity between the incorrect real word in the to-be-processed text and the candidate word corresponding to the incorrect real word in the to-be-processed text may include an editing distance and/or a common character string between the incorrect real word in the to-be-processed text and the candidate word corresponding to the incorrect real word in the to-be-processed text. That is, the candidate word corresponding to the incorrect real word in the to-be-processed text may be determined based on the editing distance and/or the common character string.

For example, the second preset condition may be that the editing distance is less than a second preset value.

It should be understood that the first preset condition and the second preset condition may be the same or different. The first preset value and the second preset value may be the same or different.

With reference to the first aspect, in some embodiments, the correcting the incorrect real word based on the target candidate word corresponding to the incorrect non-word, to obtain a correction result of the incorrect real word includes: when perplexity of the target candidate word corresponding to the incorrect real word is less than or equal to a second perplexity threshold, replacing the incorrect real word with the target candidate word corresponding to the incorrect real word, and using the target candidate word as the correction result of the incorrect real word.

In this embodiment of this application, the perplexity of the target candidate word is determined, and the non-word in the to-be-processed text is replaced with the target candidate word whose perplexity is less than or equal to the second perplexity threshold. Therefore, the semantic information of the text can be fully used, and accuracy of text error correction can be further improved.

It should be understood that the first perplexity threshold and the second perplexity threshold may be the same or different.

According to a second aspect, a text processing apparatus is provided, including an obtaining unit and a processing unit. The obtaining unit is configured to obtain a to-be-processed text. The processing unit is configured to: perform error detection processing on the to-be-processed text to obtain a non-word in the to-be-processed text; and if the non-word in the to-be-processed text belongs to a first type of non-word, use the non-word in the to-be-processed text as a correction result of the non-word in the to-be-processed text; or if the non-word in the to-be-processed text belongs to a second type of non-word, a third type of non-word, or a fourth type of non-word, select a correction mode matching the type of the non-word in the to-be-processed text to correct the non-word in the to-be-processed text and obtain a correction result of the non-word in the to-be-processed text, where the first type of non-word includes an all-uppercase-letter non-word, a non-word whose length is within a preset length range, and a non-word belonging to a first preset lexicon, the second type of non-word includes a compound incorrect non-word, the third type of non-word includes a non-word including a non-letter character, and the fourth type of non-word includes non-words other than the first type of non-word, the second type of non-word, and the third type of non-word.

With reference to the second aspect, in some embodiments, the processing unit is configured to: if the non-word in the to-be-processed text belongs to the fourth type of non-word, generate candidate words corresponding to the non-word in the to-be-processed text; determine, from the candidate words corresponding to the non-word in the to-be-processed text, a target candidate word corresponding to the non-word in the to-be-processed text; and correct the non-word in the to-be-processed text based on the target candidate word corresponding to the non-word in the to-be-processed text, to obtain the correction result of the non-word in the to-be-processed text.

With reference to the second aspect, in some embodiments, the processing unit is configured to: score, based on a similarity between the non-word in the to-be-processed text and a candidate word corresponding to the non-word in the to-be-processed text and perplexity of the candidate word corresponding to the non-word in the to-be-processed text, the candidate word corresponding to the non-word in the to-be-processed text, where the perplexity of the candidate word corresponding to the non-word in the to-be-processed text is used to indicate a possibility that the candidate word corresponding to the non-word in the to-beprocessed text occurs in the to-be-processed text; and determine a candidate word with a highest score among the candidate words corresponding to the non-word in the to-be-processed text as the target candidate word corresponding to the non-word in the to-be-processed text.

With reference to the second aspect, in some embodiments, the similarity between the non-word in the to-be-processed text and the candidate word corresponding to the non-word in the to-be-processed text meets a first preset condition.

With reference to the second aspect, in some embodiments, the processing unit is configured to: when perplexity of the target candidate word corresponding to the non-word in the to-be-processed text is less than or equal to a first perplexity threshold, replace the non-word in the to-be-processed text with the target candidate word corresponding to the non-word in the to-be-processed text, and use the target candidate word as the correction result of the non-word in the to-be-processed text.

With reference to the second aspect, in some embodiments, the compound incorrect non-word is a non-word including at least two real words; and the processing unit is configured to: if the non-word in the to-be-processed text belongs to the second type of non-word, correct the non-word in the to-be-processed text to obtain the at least two real words, and use the at least two real words as the correction result of the non-word in the to-be-processed text.

With reference to the second aspect, in some embodiments, the processing unit is configured to: if the non-word in the to-be-processed text belongs to the third type of non-word, modify a non-letter character in the non-word in the to-be-processed text to a letter, and use a modified word as the correction result of the non-word in the to-be-processed text.

With reference to the second aspect, in some embodiments, the processing unit is further configured to: perform real-word error detection on the to-be-processed text to obtain an incorrect real word in the to-be-processed text; generate candidate words corresponding to the incorrect real word; determine, from the candidate words corresponding to the incorrect real word, a target candidate word corresponding to the incorrect real word; and correct the incorrect real word based on the target candidate word corresponding to the incorrect real word.

With reference to the second aspect, in some embodiments, the processing unit is configured to: score, based on a similarity between the incorrect real word and a candidate word corresponding to the incorrect real word and perplexity of the candidate word corresponding to the incorrect real word, the candidate word corresponding to the incorrect real word, where the perplexity of the candidate word corresponding to the incorrect real word is used to indicate a possibility that the candidate word corresponding to the incorrect real word occurs in the to-be-processed text; and determine a candidate word with a highest score among the candidate words corresponding to the incorrect real word as the target candidate word corresponding to the incorrect real word.

With reference to the second aspect, in some embodiments, the similarity between the incorrect real word and the candidate word corresponding to the incorrect real word meets a second preset condition.

With reference to the second aspect, in some embodiments, the processing apparatus is configured to: when perplexity of the target candidate word corresponding to the incorrect real word is less than or equal to a second perplexity threshold, replace the incorrect real word with the target candidate word corresponding to the incorrect real word, and use the target candidate word as the correction result of the incorrect real word.

It should be understood that extensions, definitions, explanations, and descriptions of related content in the first aspect are also applicable to same content in the second aspect.

According to a third aspect, a text processing apparatus is provided. The apparatus includes a memory, configured to store a program; and a processor, configured to execute the program stored in the memory. When the processor executes the program stored in the memory, the processor is configured to perform the text processing method in the first aspect or any embodiments of the first aspect.

According to a fourth aspect, a computer readable medium is provided. The computer readable medium stores program code for execution by a device, and the program code is used to perform the text processing method in the first aspect or any embodiments of the first aspect.

According to a fifth aspect, a computer program product is provided. The computer program product includes computer program code. When the computer program code is run on a computer, the computer is enabled to perform the method in the foregoing aspect.

It should be noted that all or some of the computer program code may be stored in a first storage medium. The first storage medium may be packaged together with a processor, or may be packaged independently of a processor. This is not specifically limited in this embodiment of this application.

According to a sixth aspect, a chip is provided. The chip includes a processor and a data interface. The processor reads, by using the data interface, an instruction stored in a memory, to perform the text processing method in the first aspect or any embodiments of the first aspect.

In some embodiments, the chip may further include the memory, and the memory stores the instruction. The processor is configured to execute the instruction stored in the memory. When the instruction is executed, the processor is configured to perform the text processing method in the first aspect or any embodiments of the first aspect.

DESCRIPTION OF EMBODIMENTS

The following describes technical solutions of this application with reference to accompanying drawings.

Figure 1:
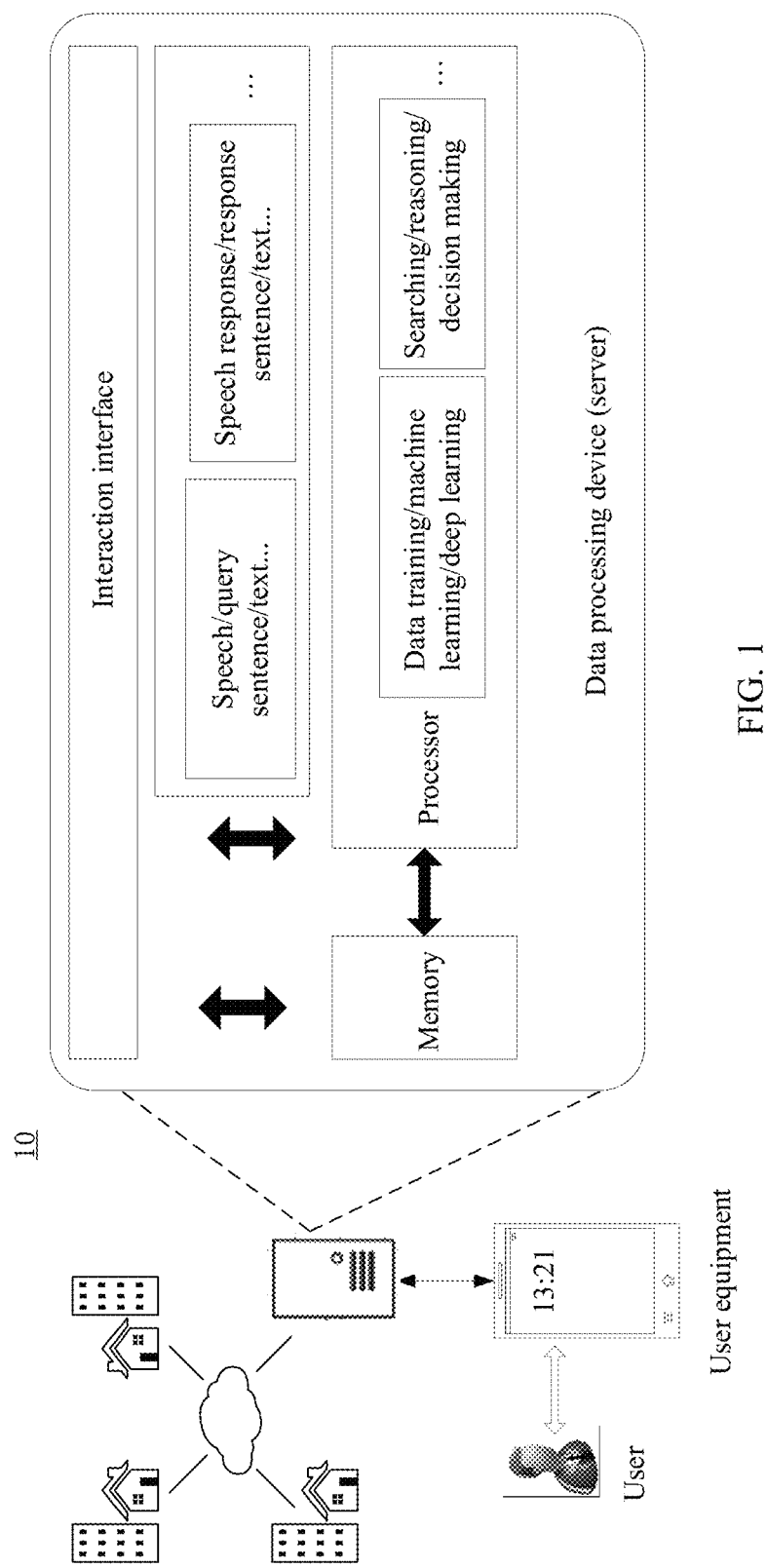
FIG. 1 is a schematic diagram of an application scenario of natural language processing according to an embodiment of this application.
Figure 2:
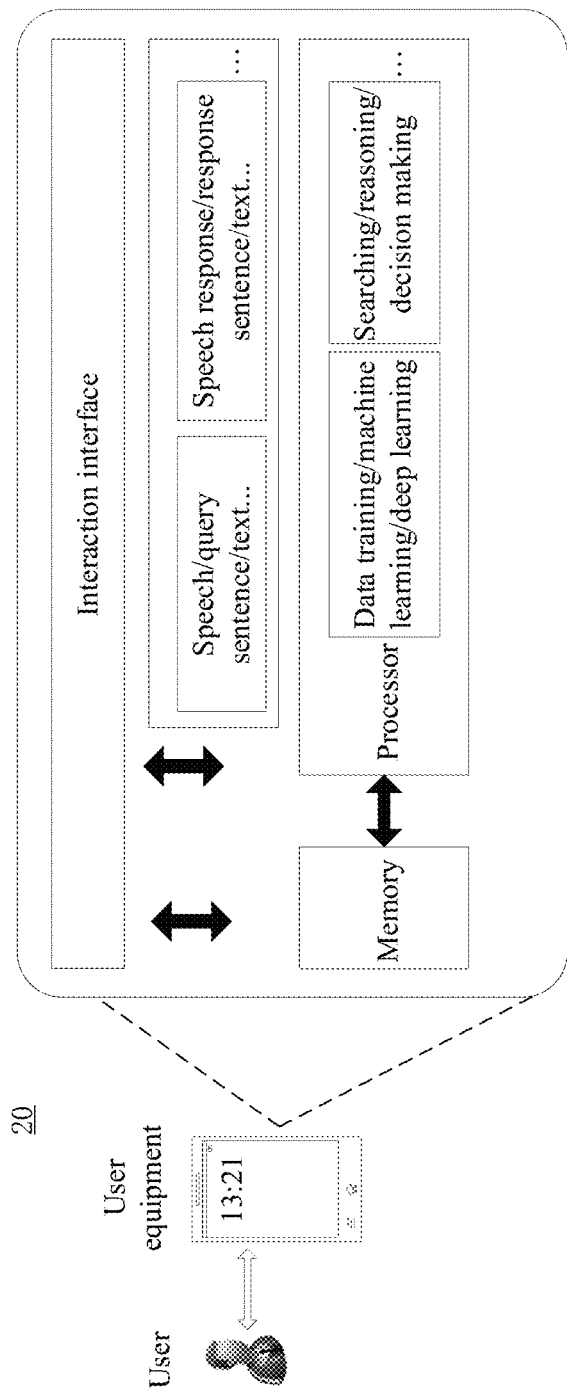
FIG. 2 is a schematic diagram of another application scenario of natural language processing according to an embodiment of this application.
Figure 3:
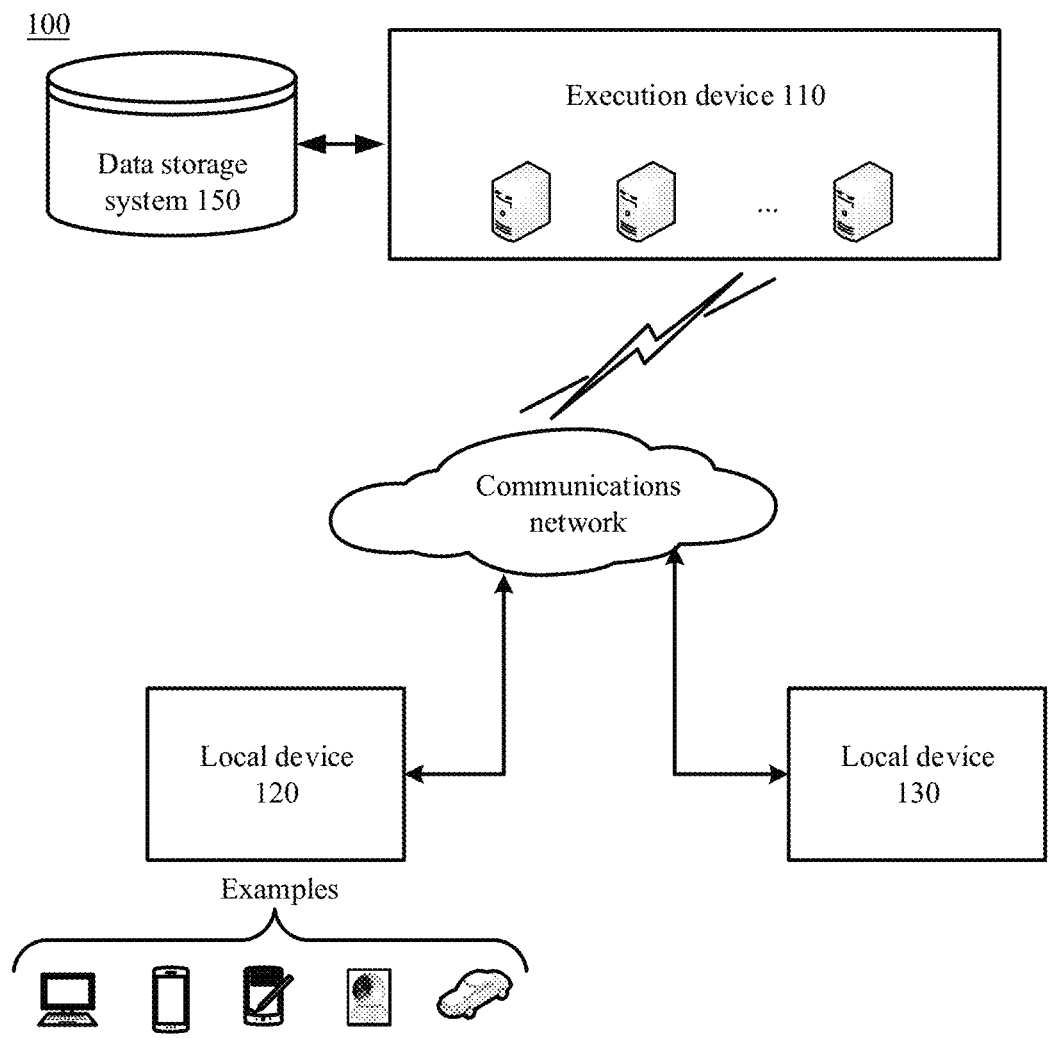
FIG. 3 is a schematic diagram of a related device for natural language processing according to an embodiment of this application.

For better understanding the solutions in the embodiments of this application, the following first briefly describes possible application scenarios of the embodiments of this application with reference to FIG. 1 to FIG. 3.

FIG. 1 shows a natural language processing system 10. The natural language processing system includes user equipment and a data processing device. The user equipment includes an intelligent terminal such as a mobile phone, a personal computer, or an information processing center. The user equipment is an initiator of natural language data processing, and serves as an initiator of a request such as a language question answer or query. Generally, a user initiates a request by using the user equipment.

The data processing device may be a device or server that has a data processing function, such as a cloud server, a network server, an application server, or a management server. The data processing device receives, by using an interaction interface, a question such as a query sentence, a speech, or a text from an intelligent terminal, and then performs language data processing in such manners as machine learning, deep learning, searching, reasoning, and decision making by using a data storage memory and a data processing processor. The memory in the data processing device may be a general term, including a local memory and a database that stores historical data. The database may be on the data processing device, or may be on another network server.

In the natural language processing system 10 shown in FIG. 1, the user equipment may receive an instruction of the user. For example, the user equipment may receive a text segment input by the user, and then initiate a request to the data processing device, so that the data processing device executes a natural language processing application (for example, text classification, text sequence annotation, or translation) on the text segment obtained by the user equipment to obtain a processing result of the corresponding natural language processing application (for example, text classification, text sequence annotation, or translation) for the text segment.

For example, the user equipment may receive a to-be-processed text input by the user, and then initiate a request to the data processing device, so that the data processing device classifies the to-be-processed text to obtain a classification result of the to-be-processed text. The classification result may be the user's semantic intention indicated by the to-be-processed text, for example, an intention of the user to indicate an intention of playing a song, setting time, or enabling navigation. Alternatively, the classification result may be further used to indicate an emotion classification result of the user. For example, the classification result may indicate that emotion classification of the user corresponding to the to-be-processed text is depression, happiness, or anger.

For example, in FIG. 1, the data processing device may perform a text processing method according to an embodiment of this application.

FIG. 2 shows another natural language processing system 20. In FIG. 2, user equipment is directly used as a data processing device, and the user equipment can directly receive an input from a user and directly perform processing by using hardware of the user equipment. A process is similar to that in FIG. 1, and reference may be made to the foregoing description. Details are not described herein again.

In the natural language processing system 20 shown in FIG. 2, the user equipment may receive an instruction of the user, and the user equipment classifies a to-be-processed text to obtain a classification result of the to-be-processed text.

In the natural language processing system 20 shown in FIG. 2, the user equipment may receive an instruction of the user. For example, the user equipment may receive a text segment input by the user, and then the user equipment executes a natural language processing application (for example, text classification, text sequence annotation, or translation) on the text segment to obtain a processing result of the corresponding natural language processing application (for example, text classification, text sequence annotation, or translation) for the text segment.

In FIG. 2, the user equipment may perform a text processing method according to an embodiment of this application.

FIG. 3 is a schematic diagram of a related device for natural language processing according to an embodiment of this application.

The user equipment in FIG. 1 and FIG. 2 may be a local device 130 or a local device 120 in FIG. 3. The data processing device in FIG. 1 may be an execution device 110 in FIG. 3. A data storage system 150 may store to-be-processed data of the execution device 110. The data storage system 150 may be integrated on the execution device 110, or may be disposed on a cloud or another network server.

The processor in FIG. 1 and FIG. 2 may perform data training, machine learning, or deep learning by using a neural network model or another model, and process the input to-be-processed text by using a model obtained by final data training or learning, to obtain the processing result of the to-be-processed text.

Because the embodiments of this application relate to a large quantity of neural network applications, for ease of understanding, the following first describes related terms and concepts of a neural network that may be used in the embodiments of this application.

(1) Neural Network

A neural network may include a neural unit. The neural unit may be an operation unit that uses $x_s$ and an intercept 1 as an input, and an output of the operation unit may be:

$$h_{W,b}(x) = f(W^T x) = f(\Sigma_{s=1}^{n} W_s x_s + b)$$

Herein, s=1, 2, . . . , n, n is a natural number greater than 1, $W_s$ is a weight of $x_s$, and b is an offset of the neural unit; and f is an activation function of the neural unit, and is used to introduce a nonlinear feature into the neural network, to convert an input signal in the neural unit into an output signal. The output signal of the activation function may be used as an input of a next convolutional layer, and the activation function may be a sigmoid function. The neural network is a network formed by connecting a plurality of single neural units together, that is, an output of one neural unit may be an input of another neural unit. An input of each neural unit may be connected to a local region of acceptance at a previous layer to extract a feature of the local region of acceptance. The local region of acceptance may be a region including several neural units.

(2) Deep Neural Network

A deep neural network (DNN), also referred to as a multilayer neural network, may be understood as a neural network having a plurality of hidden layers. The DNN is divided based on positions of different layers, and a neural network in the DNN may be divided into three types of layers: an input layer, a hidden layer, and an output layer. Generally, a first layer is the input layer, a last layer is the output layer, and all intermediate layers are hidden layers. Layers are fully connected to each other, that is, any neuron at an $i^{th}$ layer is definitely connected to any neuron at an $(i+1)^{th}$ layer.

Although the DNN seems complex, work of each layer is not complex. Simply, an expression of a linear relationship is as follows: $\vec{y}=\alpha(W \cdot \vec{x}+\vec{b})$, where $\vec{x}$ is an input vector, $\vec{y}$ is an output vector, $\vec{b}$ is an offset vector, W is a weight matrix (also referred to as a coefficient), and $\alpha(\ )$ is an activation function. At each layer, such a simple operation is performed merely on the input vector $\vec{x}$ to obtain the output vector $\vec{y}$. Because there are a large quantity of layers in the DNN, there are also a large quantity of coefficients W and offset vectors $\vec{b}$. These parameters are defined in the DNN as follows: The coefficient W is used as an example. It is assumed that in a three-layer DNN, a linear coefficient from a fourth neuron at a second layer to a second neuron at a third layer is defined as $W_{24}^{3}$. A superscript 3 represents a number of a layer at which the coefficient W is located, and a subscript corresponds to an output third-layer index 2 and an input second-layer index 4.

In summary, a coefficient from a $k^{th}$ neuron at an $(L-1)^{th}$ layer to a $j^{th}$ neuron at an $L^{th}$ layer is defined as $W_{jk}^{L}$.

It should be noted that there is no parameter W at the input layer. In the deep neural network, more hidden layers enable the network to depict a real-world complex situation better. Theoretically, a model with more parameters has higher complexity and a larger capacity, which means that the model can accomplish more complex learning tasks. Training the deep neural network is also a process of learning a weight matrix, and a final objective of the training is to obtain a weight matrix of all layers of the trained deep neural network (a weight matrix formed by vectors W of a plurality of layers).

(3) Convolutional Neural Network

A convolutional neural network (CNN) is a deep neural network with a convolutional structure. The convolutional neural network includes a feature extractor including a convolutional layer and a sub-sampling layer. The feature extractor may be considered as a filter. The convolutional layer is a neuron layer for performing convolution processing on an input signal in the convolutional neural network. At the convolutional layer of the convolutional neural network, one neuron may be connected to only some neurons at neighboring layers. The convolutional layer generally includes several feature planes, and each feature plane may include some neural units arranged in a rectangular form. Neural units on a same feature plane share a weight, and the weight shared herein is a convolution kernel. The shared weight may be understood as "a manner of extracting image information is independent of positions". The convolution kernel may be initialized in a form of a matrix of a random size. In a process of training the convolution neural network, an appropriate weight may be obtained for the convolution kernel through learning. In addition, a direct benefit of weight sharing is to reduce connections between the layers of the convolutional neural network while reducing a risk of overfitting.

(4) Loss Function

In the process of training the deep neural network, because it is expected that an output of the deep neural network is as close as possible to a predicted value that is really desired, a predicted value of the current network may be compared with a desired target value, and then a weight vector of the neural network at each layer is updated based on a difference between the predicted value and the desired target value (certainly, there is usually an initialization process before a first update, that is, parameters are preconfigured for each layer in the deep neural network). For example, if the predicted value of the network is high, the weight vector is adjusted so that the predicted value of the network is low, and the adjustment is continued until the deep neural network can predict the really desired target value or a value very close to the really desired target value. Therefore, a loss function or an objective function may be predefined to compare the difference between the predicted value and the target value. The function is an important equation used to measure the difference between the predicted value and the target value. The loss function is used as an example. If an output value (loss) of the loss function is larger, it indicates that the difference is greater, and training of the deep neural network becomes a process of minimizing the loss.

(5) Back Propagation Algorithm

The neural network may use an error back propagation (BP) algorithm to correct a parameter value in an initial neural network model in the training process, so that a reconstruction error loss of the neural network model becomes smaller. For example, an error loss occurs when an input signal is transmitted forward until the signal is output, and the parameter in the initial neural network model is updated through back propagation of error loss information, so that the error loss converges. The back propagation algorithm is a back propagation motion dominated by the error loss, and intended to obtain optimal parameters of the neural network model, such as the weight matrix.

(6) Natural Language Processing (NLP)

A natural language is a human language, and natural language processing (NLP) is processing of the human language. Natural language processing is a process of systematic analysis, understanding, and information extraction of text data in an intelligent and efficient manner. By using NLP and its components, we can manage very large chunks of text data, or perform a lot of automated tasks, and resolve various problems, such as automatic summarization, machine translation (MT), named entity recognition (NER), relation extraction (RE), information extraction (IE), emotion analysis, speech recognition, question answering system, and topic segmentation.

(7) Language Model (LM)

A language model is a basic model in NPL. Through massive corpus training and learning, the LM can infer, based on existing information (for example, text information such as words that have occurred in a context), a probability of an unknown word. It may also be understood that the LM is a model used to calculate a probability of a sentence.

In other words, the language model is probability distribution of a natural language text sequence, which represents a possibility of existence of a particular text sequence of a particular length. In short, the language model predicts a next word based on the context. Because there is no need to manually annotate the corpus, the language model can learn rich semantic knowledge from an unlimited massive corpus.

Figure 4:
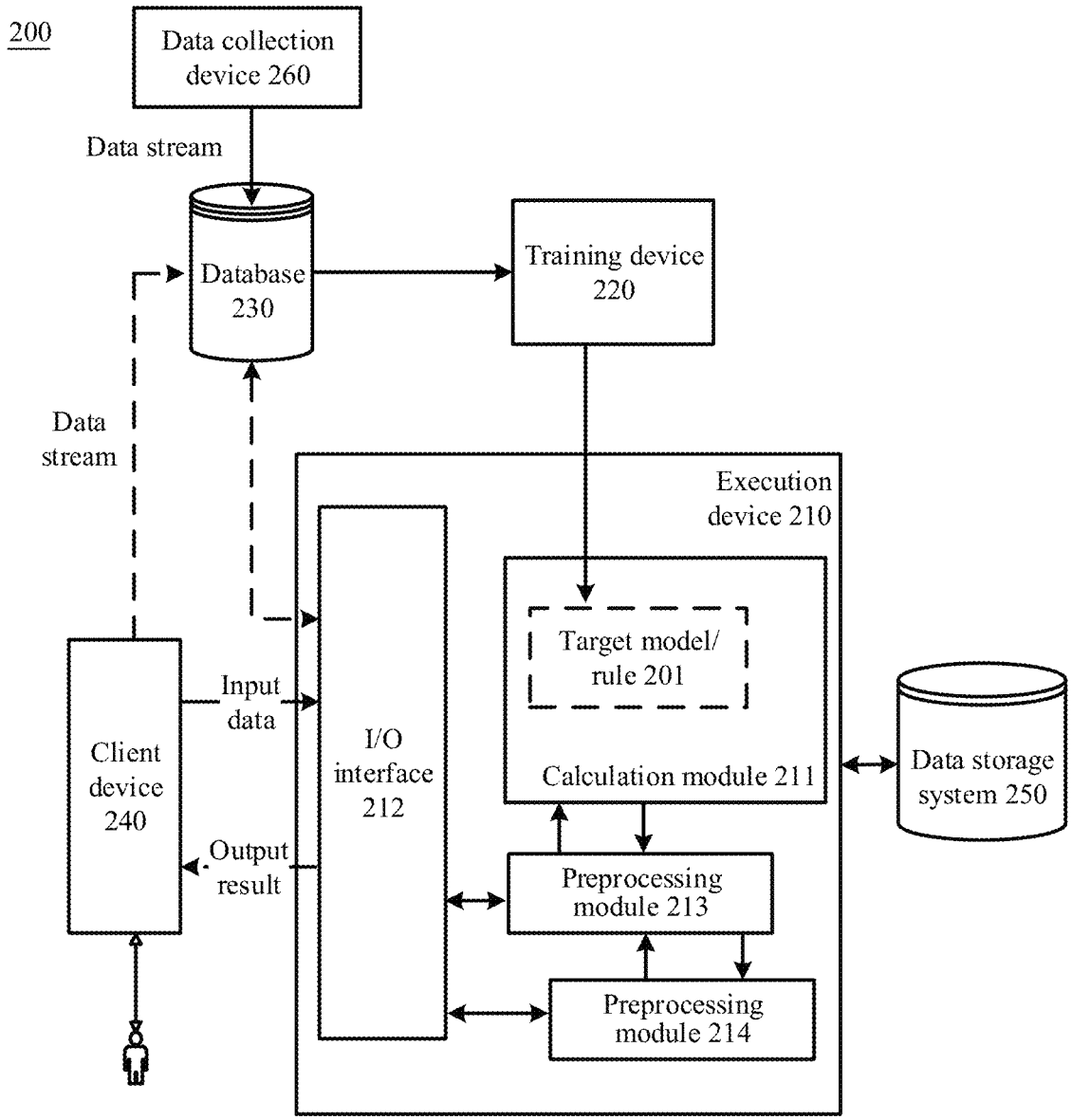
FIG. 4 is a schematic diagram of a system architecture according to an embodiment of this application.

First, a system architecture for a text processing model training method and a text processing method provided in an embodiment of this application is described. Referring to FIG. 4, an embodiment of this application provides a system architecture 200. As shown in the system architecture 200 in FIG. 4, a data collection device 260 is configured to collect training data.

For example, in this embodiment of this application, the training data may be a training text of a training text processing model.

After collecting the training data, the data collection device 260 stores the training data in a database 230, and a training device 220 obtains a target model/rule 201 (that is, the text processing model in this application) through training based on the training data maintained in the database 230.

In addition, the target model/rule 201 can be used to implement the text processing method provided in this embodiment of this application, that is, perform related preprocessing on a to-be-processed text (processing may be performed by using a preprocessing module 213 and/or a preprocessing module 214), and then the to-be-processed text is input to the target model/rule 201 for processing, and a processing result corresponding to a target task executed by the target processing model may be obtained.

For example, if the target task is text error correction, the target processing model may be a text error correction model, and the to-be-processed text is input into the target model/rule 201 (that is, the text processing model in this application) for text error correction processing, so that an error-corrected text of the to-be-processed text can be obtained.

For example, if the target task is text translation, the target student model may be a text translation model, and the to-be-processed text is input into the target model/rule 201 (that is, the text processing model in this application) for translation processing, so that a translated text of the to-be-processed text can be obtained.

In the embodiment provided in this application, the target model/rule 201 is obtained by training an original processing model. It should be noted that in an actual application, the training data maintained in the database 230 may not all be collected by the data collection device 260, but may be received from another device.

In addition, it should be noted that the training device 220 does not necessarily perform training on the target model/rule 201 completely based on the training data maintained by the database 230, but may obtain the training data from a cloud end or another place to perform model training. The foregoing description should not be used as a limitation on this embodiment of this application. It should also be noted that at least a part of data in the training data maintained in the database 230 may also be used in a process of processing the to-be-processed text by an execution device 210.

The target model/rule 201 obtained through training by the training device 220 may be applied to different systems or devices, for example, applied to the execution device 210 shown in FIG. 4. The execution device 210 may be a terminal, such as a mobile phone terminal, a tablet computer, a notebook computer, augmented reality (AR) or virtual reality (VR), or an in-vehicle terminal, or may be a server, a cloud end, or the like.

In FIG. 4, an input/output (I/O) interface 212 is configured for the execution device 210, and configured to exchange data with an external device. A user may input data to the I/O interface 212 by using a client device 240. The input data may include the to-be-processed text in this embodiment of this application.

The preprocessing module 213 and/or the preprocessing module 214 are/is configured to preprocess the input data received by the I/O interface 212. In this embodiment of this application, the preprocessing module 213 and the preprocessing module 214 may not exist (or there may be only one preprocessing module), and the input data is directly processed by using a calculation module 211. It should be noted that the preprocessing module 213 or the preprocessing module 214 may preprocess all the input data, or may preprocess a part of the input data.

It should be noted that the preprocessing module 213 and/or the preprocessing module 214 may also be trained in the training device 220. The calculation module 211 may be configured to perform, based on the target model/rule 201, related processing such as calculation on the input data from the preprocessing module 213 or the I/O interface 212.

When the execution device 210 preprocesses the input data, or when the calculation module 211 of the execution device 210 performs related processing such as calculation, the execution device 210 may invoke data, code, or the like in a data storage system 250 for corresponding processing. Data, instructions, or the like obtained through corresponding processing may also be stored in the data storage system 250.

Finally, the I/O interface 212 feeds back a processing result (for example, an error correction result or a translation result) to the client device 240. It should be understood that, corresponding to different natural language processing tasks, the target model/rule 201 is different, and corresponding processing results of the target model/rule 201 are also different.

It should be noted that, for a different downstream system, the training device 220 may generate a target model/rule 201 corresponding to the downstream system, and the corresponding target model/rule 201 may be used to achieve the foregoing objective or complete the foregoing task, to provide a required result for the user. It should be noted that the training device 220 may further generate corresponding preprocessing models for target models/rules 201 corresponding to different downstream systems, for example, corresponding preprocessing models in the preprocessing module 213 and/or the preprocessing module 214.

In the case shown in FIG. 4, the user may manually give the input data (for example, the to-be-processed text), and the manually giving may be an operation performed through an interface provided by the I/O interface 212. In another case, the client device 240 may automatically send the input data (for example, the to-be-processed text) to the I/O interface 212. If authorization of the user is to be obtained for requesting the client device 240 to automatically send the input data, the user may set a corresponding permission on the client device 240. The user may view, on the client device 240, a result output by the execution device 210, and a presentation form may be a manner such as display, sound, or action. The client device 240 may also serve as a data collection end to collect the input data input to the I/O interface 212 and the output result output from the I/O interface 212 shown in the figure, as new sample data, and store the new sample data in the database 230. Certainly, collection may alternatively not be performed by the client device 240, but the I/O interface 212 directly stores the input data input to the I/O interface 212 and the output result output from the I/O interface 212, as new sample data in the database 230.

It should be noted that FIG. 4 is merely a schematic diagram of the system architecture according to this embodiment of this application. Position relationships between devices, components, modules, and the like shown in the figure are not limited. For example, in FIG. 4, the data storage system 250 is an external memory relative to the execution device 210. In other cases, the data storage system 250 may be disposed in the execution device 210.

As shown in FIG. 4, the target model/rule 201 is obtained through training by the training device 220. The target model/rule 201 may be the target processing model in this embodiment of this application. For example, the target processing model provided in this embodiment of this application may be a neural network model. For example, the target processing model may be a CNN, or a deep convolutional neural network (DCNN).

Figure 5:
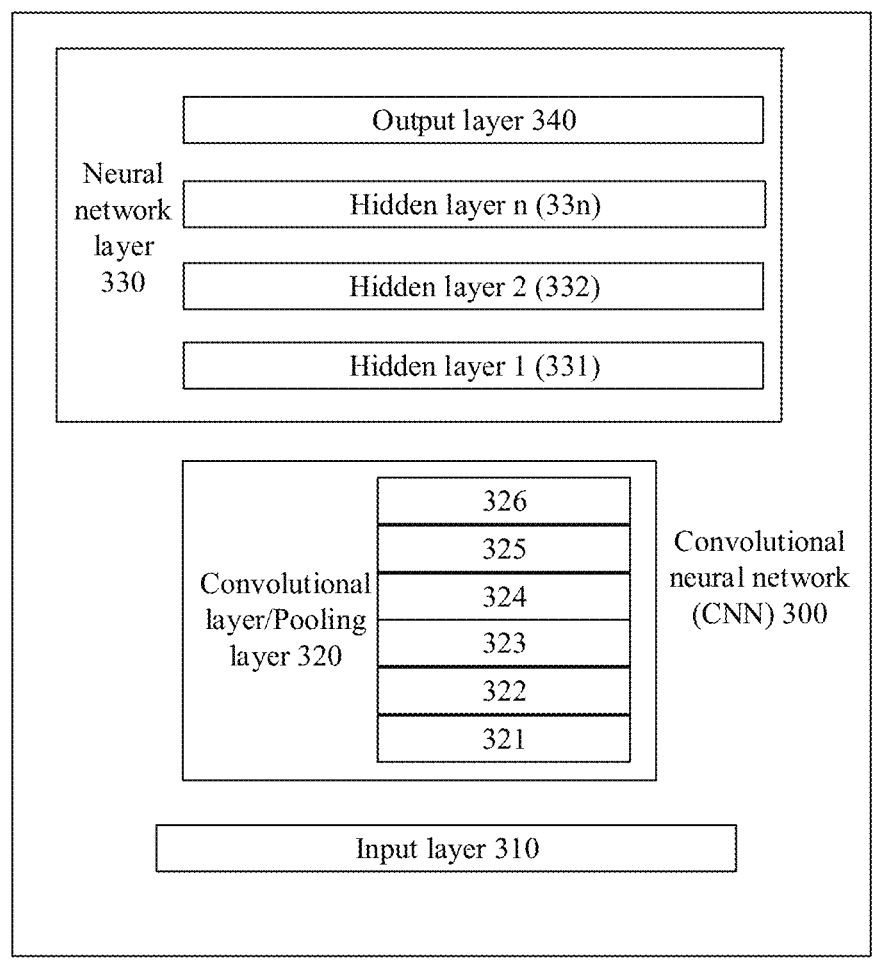
FIG. 5 is a schematic diagram for performing text processing based on a CNN model according to an embodiment of this application.

Because the CNN is a very common neural network, the following describes a structure of the CNN in detail with reference to FIG. 5. As described in the foregoing basic concepts, the convolutional neural network is a deep neural network with a convolutional structure and is a deep learning architecture. The deep learning architecture refers to learning at a plurality of layers at different abstraction layers by using machine learning algorithms. As a deep learning architecture, the CNN is a feed-forward artificial neural network, and each neuron in the feed-forward artificial neural network may respond to an image input in the neuron.

As shown in FIG. 5, a convolutional neural network (CNN) 300 may include an input layer 310, a convolutional layer or pooling layer 320 (the pooling layer is optional), and a neural network layer 330. The following describes related content of these layers in detail.

Convolutional Layer or Pooling Layer 320:
Convolutional Layer:

As shown in FIG. 5, for example, the convolutional layer or pooling layer 320 may include layers 321 to 326. For example, in some embodiments, the layer 321 is a convolutional layer, the layer 322 is a pooling layer, the layer 323 is a convolutional layer, the layer 324 is a pooling layer, the layer 325 is a convolutional layer, and the layer 326 is a pooling layer. In some embodiments, the layers 321 and 322 are convolutional layers, the layer 323 is a pooling layer, the layers 324 and 325 are convolutional layers, and the layer 326 is a pooling layer. That is, an output of a convolutional layer may be used as an input of a subsequent pooling layer, or may be used as an input of another convolutional layer to continue a convolution operation.

The following uses the convolutional layer 321 as an example to describe an internal operating principle of the convolutional layer.

The convolutional layer 321 may include a plurality of convolution operators. The convolution operator is also referred to as a kernel, and a function of the convolution operator in natural language processing is equivalent to a filter for extracting information from input speech or semantic information. The convolution operator may essentially be a weight matrix. This weight matrix is usually predefined.

Weight values in these weight matrices need to be obtained through a large amount of training in an actual application. Each weight matrix formed by using the weight values obtained through training may extract information from input data, thereby helping the convolutional neural network 300 to perform correct prediction.

When the convolutional neural network 300 has a plurality of convolutional layers, an initial convolutional layer (for example, 321) usually extracts a relatively large quantity of general features, and the general features may also be referred to as low-level features. As a depth of the convolutional neural network 300 increases, features extracted from a subsequent convolutional layer (for example, 326), for example, features such as high-level semantics, become more complex, and features with higher-level semantics are more applicable to a to-be-resolved problem.

Pooling Layer:

Because a quantity of training parameters often is to be reduced, a pooling layer often may be periodically introduced after a convolutional layer. For example, the layers 321 to 326 shown in 320 in FIG. 5 may be as follows: One convolutional layer is followed by one pooling layer; or a plurality of convolutional layers are followed by one or more pooling layers. In natural language data processing, a sole purpose of the pooling layer is to reduce a space size of the data.

Neural Network Layer 330:

After processing at the convolutional layer or pooling layer 320, the convolutional neural network 300 still cannot sufficiently output required output information. Because as described above, the convolutional layer or pooling layer 320 only extracts features and reduces parameters introduced by the input data. However, to generate the final output information (required class information or other related information), the convolutional neural network 300 may use the neural network layer 330 to generate an output of one or a group of required classes. Therefore, the neural network layer 330 may include a plurality of hidden layers (331, and 332 to 33n shown in FIG. 5) and an output layer 340. Parameters included in the plurality of hidden layers may be obtained by performing pre-training based on related training data of a specific task type. For example, the task type may include speech or semantic recognition, classification, or generation.

The output layer 340 is located after the plurality of hidden layers in the neural network layer 330, that is, it is the last layer of the entire convolutional neural network 300. The output layer 340 has a loss function similar to a classification cross entropy, for example, for calculating a prediction error. Once forward propagation of the entire convolutional neural network 300 (as shown in FIG. 5, propagation from 310 to 340 is forward propagation) is completed, back propagation (as shown in FIG. 5, propagation from 340 to 310 is back propagation) starts to update weight values and offsets of the layers mentioned above to reduce a loss of the convolutional neural network 300 and an error between a result output by the convolutional neural network 300 through the output layer and an ideal result.

It should be noted that the convolutional neural network 300 shown in FIG. 5 is used only as an example of a convolutional neural network. In an embodiment, the convolutional neural network may alternatively exist in a form of another network model.

Figure 6:
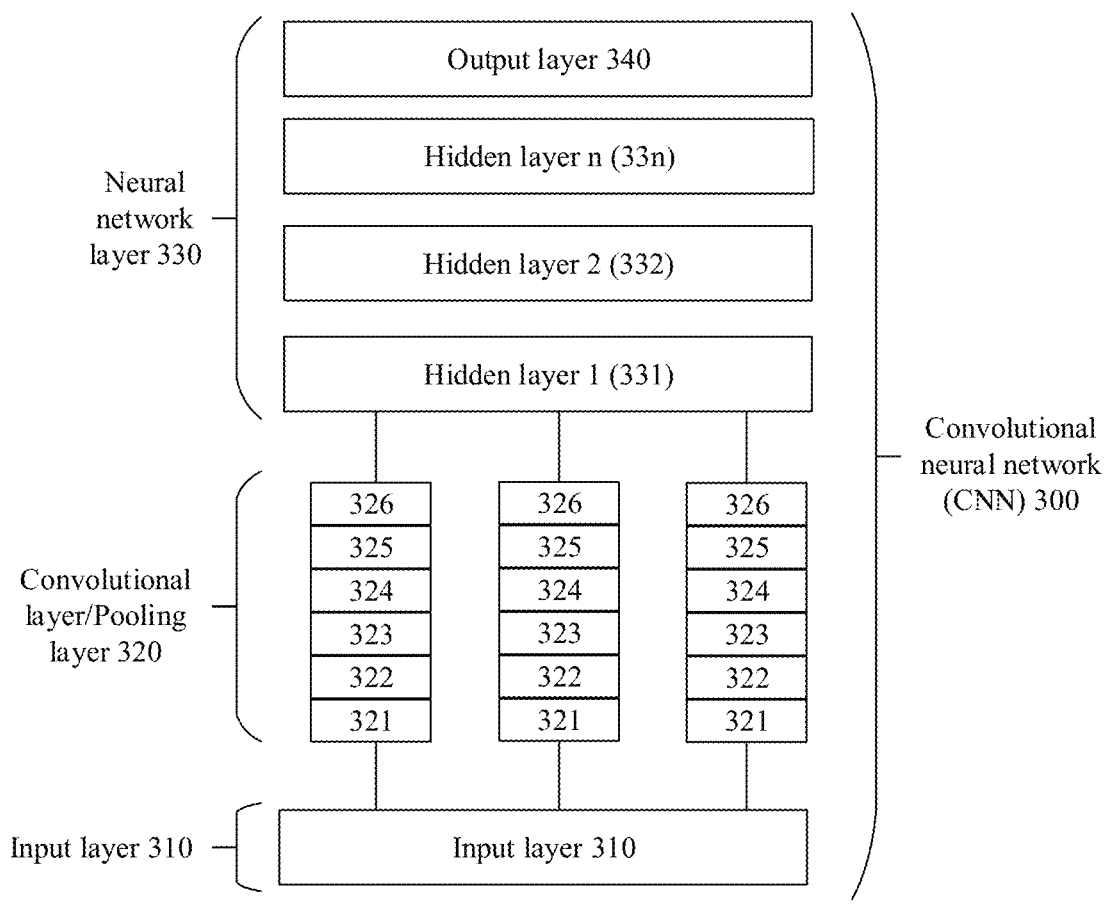
FIG. 6 is another schematic diagram for performing text processing based on a CNN model according to an embodiment of this application.

As shown in FIG. 6, a convolutional neural network (CNN) 300 may include an input layer 310, a convolutional layer or pooling layer 320 (the pooling layer is optional), and a neural network layer 330. In FIG. 6, a plurality of convolutional layers or pooling layers in the convolutional layer or pooling layer 320 are parallel, and separately extracted features are all input to the neural network layer 330 for processing.

Figure 7:
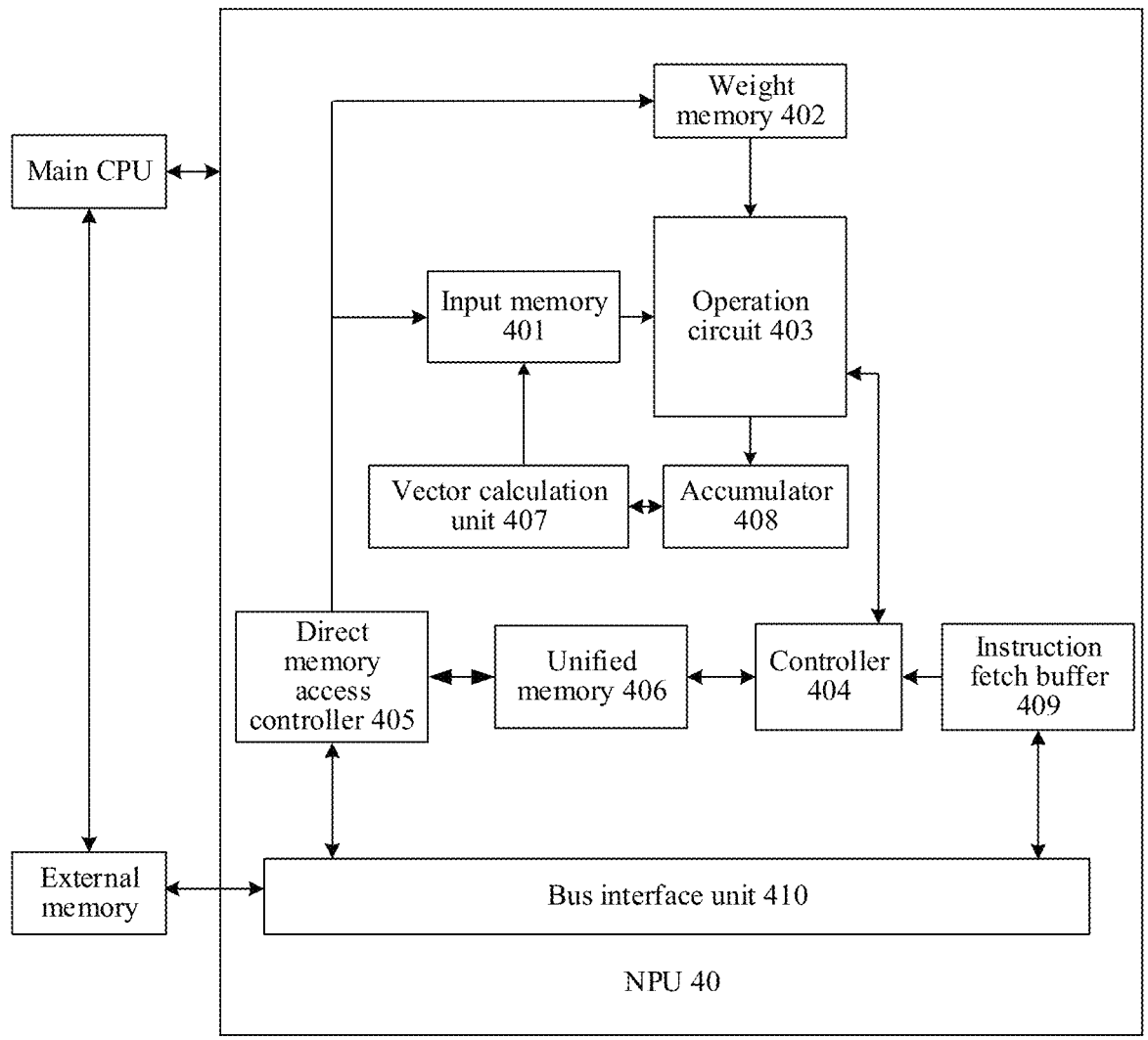
FIG. 7 is a schematic diagram of a hardware structure of a chip according to an embodiment of this application.

FIG. 7 is a schematic diagram of a hardware structure of a chip according to an embodiment of this application. The chip includes a neural processing unit (NPU) 40. The chip may be disposed in the execution device 210 shown in FIG. 4, and configured to complete calculation work of the calculation module 211. Alternatively, the chip may be disposed in the training device 220 shown in FIG. 4, and configured to complete training work of the training device 220 and output the target model/rule 201. An algorithm of each layer in the convolutional neural network shown in FIG. 5 and FIG. 6 may be implemented in the chip shown in FIG. 7.

As a coprocessor, the NPU 40 may be mounted to a main CPU (host CPU), and the main CPU allocates a task. A core part of the NPU 40 is an operation circuit 403. When the NPU 40 works, a controller 404 in the NPU 40 may control the operation circuit 403 to extract data in a memory (a weight memory or an input memory) and perform an operation.

In some embodiments, the operation circuit 403 includes a plurality of processing units (process engine, PE). In some embodiments, the operation circuit 403 is a two-dimensional systolic array. The operation circuit 403 may alternatively be a one-dimensional systolic array or another electronic circuit capable of performing mathematical operations such as multiplication and addition. In some embodiments, the operation circuit 403 is a general-purpose matrix processor.

For example, it is assumed that there is an input matrix A, a weight matrix B, and an output matrix C. The operation circuit fetches corresponding data of the matrix B from a weight memory 402, and buffers the data on each PE in the operation circuit. The operation circuit obtains data of the matrix A from the input memory 401, performs a matrix operation on the data and the matrix B, and stores an obtained partial result or final result of the matrix in an accumulator (accumulator) 408.

A vector calculation unit 407 may perform further processing on the output of the operation circuit, for example, vector multiplication, vector addition, exponential operation, logarithmic operation, and value comparison. For example, the vector calculation unit 407 may be configured to perform network calculation at a non-convolutional/non-fully connected (FC) layer of the neural network, for example, pooling, batch normalization, and local response normalization.

In some embodiments, the vector calculation unit 407 can store a processed and output vector in a unified buffer 406. For example, the vector calculation unit 407 may apply a non-linear function to the output of the operation circuit 403, such as a vector of an accumulated value, to generate an active value. In some embodiments, the vector calculation unit 407 generates a normalized value, a merged value, or both. In some embodiments, the processed and output vector can be used as an activation input to the operation circuit 403, for example, for use in subsequent layers in the neural network.

The unified memory 406 is configured to store input data and output data.

Weight data is directly transferred to the weight memory 402 by using a direct memory access controller (DMAC) 405, input data in an external memory is transferred to the input memory 401 and/or the unified memory 406, weight data in the external memory is stored in the weight memory 402, and the data in the unified memory 406 is stored in the external memory.

A bus interface unit (BIU) 410 is configured to implement interaction between the main CPU, the DMAC, and an instruction fetch buffer 409 by using a bus.

The instruction fetch buffer 409 connected to the controller 404 is configured to store an instruction used by the controller 404.

The controller 404 is configured to invoke the instruction buffered in the instruction fetch buffer 409, to control a working process of the operation accelerator.

Generally, the unified memory 406, the input memory 401, the weight memory 402, and the instruction fetch buffer 409 may all be on-chip memories. The external memory of the NPU may be a memory outside the NPU, and the external memory may be a double data rate synchronous dynamic random access memory (DDR SDRAM), a high bandwidth memory (HBM), or another readable and writable memory. It should be understood that the hardware structure of the chip shown in FIG. 7 is merely an example for description, and this application is not limited thereto.

Figure 8:
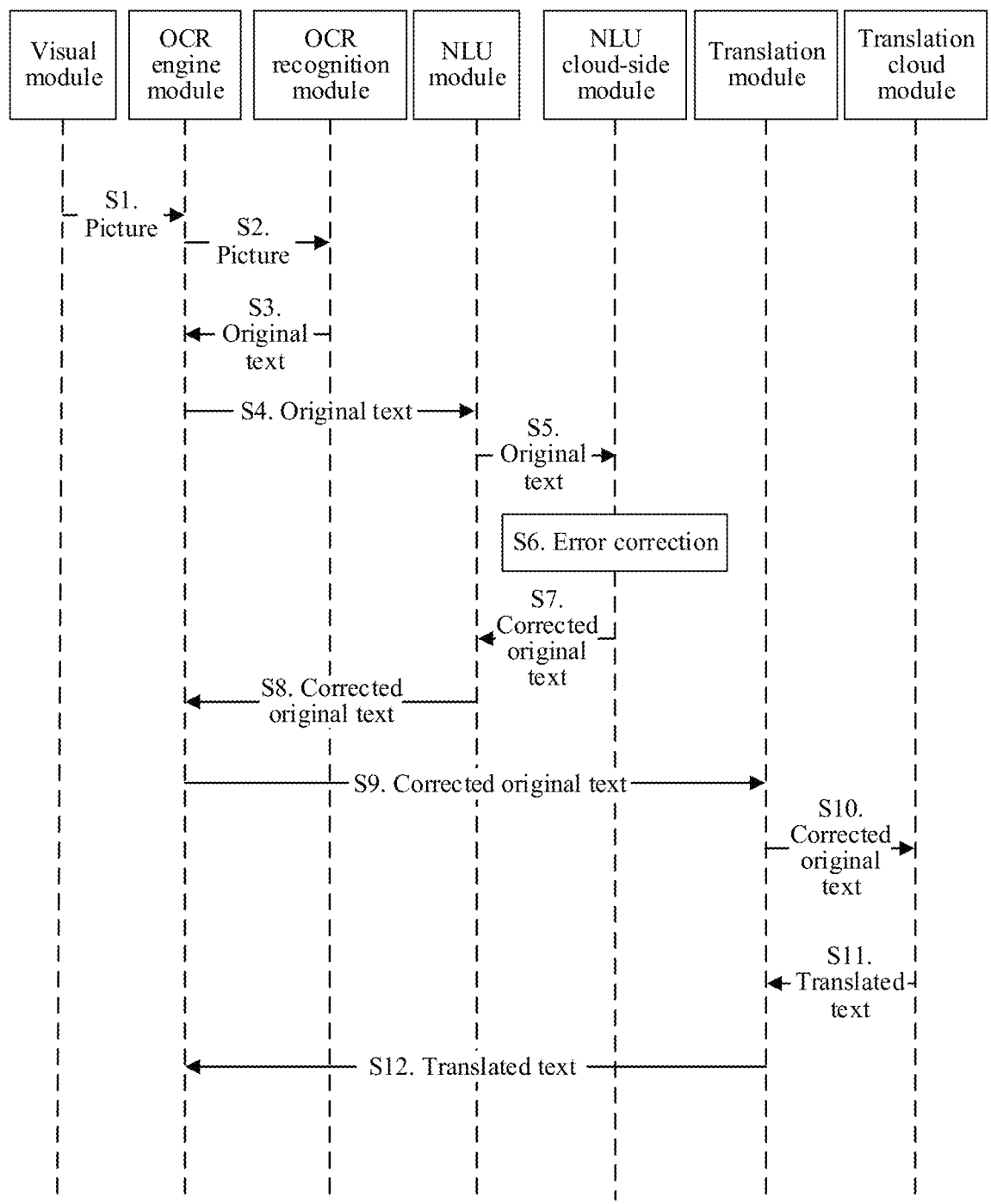
FIG. 8 is a schematic diagram of an application scenario according to an embodiment of this application.

FIG. 8 is a schematic structural diagram of a system in a translation scenario according to an embodiment of this application. As shown in FIG. 8, a text processing method in an embodiment of this application may be performed by a natural language understanding (NLU) cloud-side module.

The system includes a visual module, an OCR engine module, an OCR recognition module, an NLU module, an NLU cloud-side module, a translation module, and a translation cloud module.

The visual module is configured to capture a picture. For example, the visual module may capture a picture in a manner such as photographing.

The OCR engine module is configured to schedule an OCR task.

The OCR recognition module is configured to recognize characters based on an OCR algorithm.

The NLU module is configured to schedule an NLU-related task.

The NLU cloud-side module is configured to correct an incorrect word/grammar in a received text.

The translation module is configured to schedule translation tasks between a plurality of languages.

The translation cloud module is configured to translate the received text.

With reference to FIG. 8, the following describes in detail the text processing method applied to the translation scenario in this embodiment of this application.

S1. The visual module transmits a captured picture to the OCR engine module.

S2. The OCR engine module transmits the picture to the OCR recognition module through scheduling.

S3. The OCR recognition module recognizes a text in the picture, that is, an original text, and returns the original text to the OCR engine module.

S4. The OCR engine module transmits the original text to the NLU module.

S5. The NLU module transmits the original text to the NLU cloud-side module through scheduling.

S6. The NLU cloud-side module corrects an incorrect word/grammar in the original text to obtain a corrected original text.

S7. The NLU cloud-side module returns the corrected original text to the NLU module.

S8. The NLU module returns the corrected original text to the OCR engine module.

S9. The OCR engine module transmits the corrected original text to the translation module.

S10. The translation module transmits the corrected original text to the translation cloud module through scheduling.

S11. The translation cloud module performs translation to obtain a translated text, and returns the translated text to the translation module.

S12. The translation module returns the translated text to the OCR engine module.

In the system, the text processing method is used for text error correction, that is, a text processing model may be a text error correction model. A to-be-processed text is input into the text processing model for error correction processing, and a correction result of the to-be-processed text can be obtained. It should be understood that FIG. 8 is merely an example of the text processing method in this embodiment of this application. In some embodiments, the text processing model may be a text translation model, and the to-be-processed text is input into the text translation model for error correction processing. Then translation processing is performed on a correction result, and a translated text of the to-be-processed text can be obtained.

It should be understood that the foregoing is merely an example of the text processing model in this embodiment of this application.

The text processing model in FIG. 8 is deployed on a cloud server. It should be understood that the text processing model may also be deployed on an intelligent terminal device. The intelligent terminal may be an electronic device having a camera. For example, the intelligent terminal may be a mobile phone with an image processing function, a tablet personal computer (TPC), a media player, a smart TV, a laptop computer (LC), a personal digital assistant (PDA), a personal computer (PC), an in-vehicle terminal in a self-driving vehicle, or the like. This is not limited in this embodiment of this application.

Figure 9:
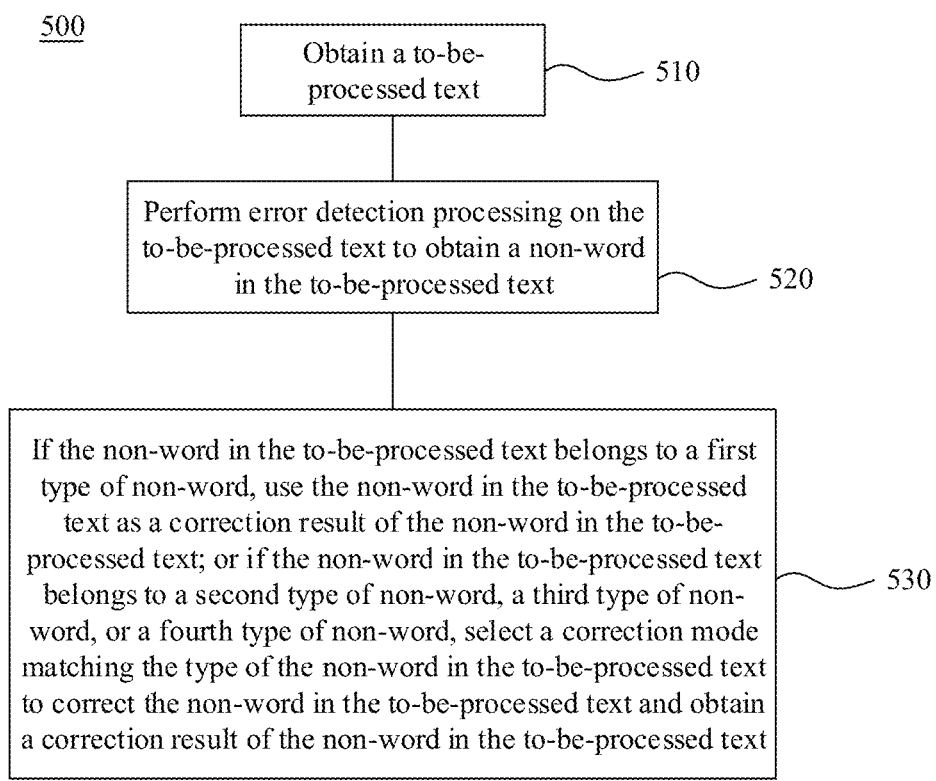
FIG. 9 is a schematic flowchart of a text processing method according to an embodiment of this application.

FIG. 9 is a schematic flowchart of a text processing method according to an embodiment of this application. The text processing method shown in FIG. 9 may be performed by a text processing apparatus. The apparatus may be, for example, the data processing device in FIG. 1, the user equipment in FIG. 2, the execution device 110 or the local device in FIG. 3, or the execution device 210 in FIG. 4. The method shown in FIG. 8 includes operations 510 to 530. The following separately describes operations 510 to 530 in detail.

510. Obtain a to-be-processed text.

The to-be-processed text may be an OCR output text, or may be a text input by a user.

For example, the OCR output text may include an OCR output text corresponding to a portable document format (pdf). The OCR output text may further include an OCR output text corresponding to a power point (PPT). The OCR output text may further include an OCR output text corresponding to a shot picture.

For another example, the text input by the user may include content published in a social network, or may be content input in a search box of a search engine. It should be understood that the to-be-processed text may be any text on which error correction is to be performed. A specific form of the to-be-processed text is not limited in this embodiment of this application.

520. Perform error detection processing on the to-be-processed text to obtain a non-word in the to-be-processed text.

Errors in the to-be-processed text may include a non-word error and a real-word error. The non-word error means that a word in the to-be-processed text is not in a second preset lexicon. The real-word error means that a word in the to-be-processed text exists in the second preset lexicon, but causes a problem in contextual semantics, and is not a word required in a current context. That is, incorrect words in the to-be-processed text may include a non-word and an incorrect real-word.

For example, non-word error detection may be performed on the to-be-processed text based on the second preset lexicon, to obtain a non-word in the to-be-processed text. The second preset lexicon can be used to distinguish between real words and non-words. A real word is a word that exists in the second preset lexicon, and correspondingly, a non-word is a word that does not exist in a first preset lexicon.

Any lexicon that can be used to detect a non-word error may be understood as the second preset lexicon. For example, when the method 500 is applied to English text error correction, the second preset lexicon may be an English lexicon, and a non-word is a word that does not exist in the English lexicon, for example, werld. A type of the second preset lexicon is not limited in this embodiment of this application.

It should be understood that in this embodiment of this application, the "lexicon" may also be referred to as a "dictionary", a "vocabulary", or the like.

530. If the non-word in the to-be-processed text belongs to a first type of non-word, use the non-word in the to-be-processed text as a correction result of the non-word in the to-be-processed text, that is, do not process the non-word in the to-be-processed text.

The first type of non-word includes an all-uppercase-letter non-word, a non-word whose length is within a preset length range, and a non-word belonging to a preset lexicon.

If the non-word in the to-be-processed text belongs to a second type of non-word, a third type of non-word, or a fourth type of non-word, a correction mode matching the type of the non-word in the to-be-processed text is selected, to correct the non-word in the to-be-processed text and obtain a correction result of the non-word in the to-be-processed text.

The second type of non-word includes a compound incorrect non-word. The third type of non-word includes a non-word including a non-letter character. The fourth type of non-word includes non-words other than the first type of non-word, the second type of non-word, and the third type of non-word. In this embodiment of this application, the fourth type of non-word may also be referred to as a normal type of non-word.

As described above, the first type of non-word includes a non-word whose length is within the preset length range. The non-word whose length is within the preset length range may include a non-word whose length is greater than a first preset length and/or a non-word whose length is less than a second preset length.

That is, the non-word whose length is within the preset length range may include an excessively long or excessively short non-word. For example, the excessively long non-word may be a web address. The excessively short non-word may include only one or two characters, or the like.

The excessively long non-word is usually a proper noun. Generally, the non-word of this type does not need to be processed. Through detection of the non-word of this type, processing of the non-word of this type is avoided, and a correction error is avoided.

There is little valid information in the excessively short non-word, and credibility of a corrected non-word is not high. Through detection of the non-word of this type, processing of the non-word of this type is avoided, and a text processing speed can be improved.

As described above, the first type of non-word includes a non-word belonging to a first preset lexicon.

The first preset lexicon may include a preset low-frequency lexicon. The preset low-frequency lexicon may be set according to an application requirement. For example, the preset low-frequency lexicon may include a person name or a place name.

The first preset lexicon may further include a lexicon in another language. For example, if the method 500 is used to perform error correction on a to-be-processed text in English, the lexicon in the another language may include a lexicon in a language such as Russian, French, German, Italian, or Portuguese, and/or a pinyin lexicon.

The second type of non-word includes a compound incorrect non-word. The compound incorrect non-word is a non-word that includes at least two real words.

If the non-word in the to-be-processed text belongs to the second type of non-word, the non-word in the to-be-processed text is corrected to obtain the at least two real words, and the at least two real words are used as the correction result of the non-word in the to-be-processed text. That is, the non-word is replaced with the obtained at least two real words.

For example, a space may be added in an appropriate position in the non-word to modify the non-word into at least two real words.

For example, the non-word in the to-be-processed text is inChina, the non-word belongs to the second type of non-word, and a space is added to the non-word to modify the non-word into "in China".

Further, modified at least two real words are input into a language model, and if the modified at least two real words can reduce perplexity, the modified at least two real words are used as the correction result of the non-word in the to-be-processed text.

The third type of non-word includes a non-word including a non-letter character.

For example, the third type of non-word includes a non-word including a digit, for example, a5ses.

If the non-word in the to-be-processed text belongs to the third type of non-word, a non-letter character in the non-word in the to-be-processed text is modified to a letter, and a modified word is used as the correction result of the non-word in the to-be-processed text. That is, the non-word is replaced with the modified word.

For example, a character other than a letter in the non-word in the to-be-processed text may be modified to a letter by using a preset character misjudgment lexicon, and a modified word is used as the correction result of the non-word in the to-be-processed text.

In some embodiments, the non-word in the to-be-processed text may be further used as the correction result of the non-word in the to-be-processed text by using the preset character misjudgment lexicon, that is, the non-word is not processed.

When the to-be-processed text is an OCR output text, the character misjudgment lexicon may be determined based on an OCR recognition error probability. The OCR recognition error probability is a probability of incorrectly recognizing a letter as a digit. For example, the character misjudgment lexicon may be determined based on a recognition result of the OCR recognition module in FIG. 8 by using historical experience.

For example, a digit 0 is similar to a letter O, and an OCR recognition error probability is relatively high. When 0 occurs in the non-word, 0 may be replaced with O. For another example, a digit 5 is similar to a letter s, and an OCR recognition error probability is relatively high. When 5 occurs in the non-word, 5 may be replaced with s. For example, assess may be replaced with assess. For another example, for a non-word iphone4, the digit 4 does not correspond to any letter in the character misjudgment lexicon, and the non-word iphone4 may not be processed.

Further, the modified word may be input into the language model, and if the modified word can reduce perplexity, the modified word is used as the correction result of the non-word in the to-be-processed text.

If the non-word in the to-be-processed text belongs to the fourth type of non-word, the correcting the non-word in the to-be-processed text includes operation A1 to operation A3.

A1. Generate a candidate word corresponding to the non-word in the to-be-processed text.

A similarity between the non-word in the to-be-processed text and the candidate word corresponding to the non-word in the to-be-processed text meets a first preset condition.

There may be one or more candidate words corresponding to the non-word in the to-be-processed text.

The similarity between the non-word in the to-be-processed text and the candidate word corresponding to the non-word in the to-be-processed text may include an editing distance and/or a common character string between the non-word in the to-be-processed text and the candidate word corresponding to the non-word in the to-be-processed text. That is, the candidate word corresponding to the non-word in the to-be-processed text may be determined based on the editing distance and/or the common character string.

The editing distance is a quantity of editing operations required to convert one word into another word. The editing operations include operations such as inserting, deleting, transposing, and replacing characters in words.

The common character string is a quantity of consecutive same characters contained in two words.

For example, the candidate word corresponding to the non-word in the to-be-processed text may be generated by using a BK tree (Burkhard Keller tree).

Operation A1 is described by using an example in which the similarity between the non-word in the to-be-processed text and the candidate word corresponding to the non-word in the to-be-processed text includes the editing distance between the non-word in the to-be-processed text and the candidate word corresponding to the non-word in the to-be-processed text.

For example, the first preset condition may be that the editing distance is less than a first preset value.

For example, the editing distance between the non-word in the to-be-processed text and the candidate word corresponding to the non-word in the to-be-processed text is limited to less than 3, and the candidate word corresponding to the non-word in the to-be-processed text is generated. That is, a quantity of operations in a process of generating, by using the non-word, the candidate word corresponding to the non-word in the to-be-processed text is less than 3.

Operation A1 is described by using an example in which the similarity between the non-word in the to-be-processed text and the candidate word corresponding to the non-word in the to-be-processed text includes the editing distance and/or the common character string between the non-word in the to-be-processed text and the candidate word corresponding to the non-word in the to-be-processed text.

For example, the first preset condition may include a preset condition 1 and a preset condition 2. The first preset condition 1 may be that the editing distance is less than a preset value. The preset condition 2 may be that a length of a longest common character string is greater than a preset length value.

For example, the candidate word corresponding to the non-word in the to-be-processed text may be generated by using the preset condition 1 and the preset condition 2 separately, that is, the similarity between the non-word in the to-be-processed text and the candidate word corresponding to the non-word in the to-be-processed text meets the preset condition 1 or the preset condition 2.

Alternatively, the candidate word corresponding to the non-word in the to-be-processed text may be generated by using the preset condition 1 and the preset condition 2 simultaneously, that is, the similarity between the non-word in the to-be-processed text and the candidate word corresponding to the non-word in the to-be-processed text meets the preset condition 1 and the preset condition 2.

For example, the editing distance between the non-word in the to-be-processed text and the candidate word corresponding to the non-word in the to-be-processed text is limited to less than 3, and a candidate word A corresponding to the non-word in the to-be-processed text is generated. That is, a quantity of operations in a process of generating, by using the non-word, the candidate word corresponding to the non-word in the to-be-processed text is less than 3. The length of the longest common character string between the non-word in the to-be-processed text and the candidate word corresponding to the non-word in the to-be-processed text is limited to more than 3, and a candidate word B corresponding to the non-word in the to-be-processed text is generated. That is, more than three consecutive same characters are included in the candidate word corresponding to the non-word in the to-be-processed text and the non-word. The candidate word corresponding to the non-word in the to-be-processed text may include the candidate word A and the candidate word B. Alternatively, the candidate word corresponding to the non-word in the to-be-processed text may include a same candidate word in the candidate word A and the candidate word B.

It should be understood that the similarity may alternatively be a similarity in another form, for example, a character similarity. A manner of determining a similarity between the non-word in the to-be-processed text and a plurality of candidate words corresponding to the non-word in the to-be-processed text is not limited in this application.

For example, the non-word in the to-be-processed text is werld, and a candidate word corresponding to werld determined based on a minimum editing distance and/or a longest common character string may include world, word, sword, and the like.

A2. Determine, from the candidate words corresponding to the non-word in the to-be-processed text, a target candidate word corresponding to the non-word in the to-be-processed text.

For example, operation A2 may be: randomly determining, from the candidate words corresponding to the non-word in the to-be-processed text, the target candidate word corresponding to the non-word in the to-be-processed text.

In some embodiments, operation A2 may include operation A21 and operation A22.

A21. Score, based on a similarity between the non-word in the to-be-processed text and a candidate word corresponding to the non-word in the to-be-processed text and perplexity of the candidate word corresponding to the non-word in the to-be-processed text, the candidate word corresponding to the non-word in the to-be-processed text, where the perplexity of the candidate word corresponding to the non-word in the to-be-processed text is used to indicate a possibility that the candidate word corresponding to the non-word in the to-be-processed text occurs in the to-be-processed text.

For example, the similarity between the non-word in the to-be-processed text and the candidate word corresponding to the non-word in the to-be-processed text may include the editing distance between the non-word in the to-be-processed text and the candidate word corresponding to the non-word in the to-be-processed text.

The similarity between the non-word in the to-be-processed text and the candidate word corresponding to the non-word in the to-be-processed text may be scored based on the editing distance.

The perplexity of the candidate word corresponding to the non-word in the to-be-processed text may be scored by using the language model.

For example, the language model may be a statistical language model, for example, an n-gram model.

The statistical language model is more advantageous in extracting semantic information from short and medium texts, and is applicable to a scenario that does not rely on long-distance semantic information, for example, text error correction in an OCR scenario.

For another example, the language model may alternatively be a neural network model, for example, a recurrent neural network (RNN) model.

A score corresponding to each candidate word may be obtained by weighting scores corresponding to the foregoing several items, that is, a weight is set for a score corresponding to each item. The weight may be preset, or may be obtained through training.

The scoring is based on the similarity and the perplexity of the text, and the similarity between the non-word and the candidate word and the semantic information of the to-be-processed text are considered. Therefore, a more accurate scoring result can be obtained.

A22. Determine a candidate word with a highest score among the candidate words corresponding to the non-word in the to-be-processed text as the target candidate word corresponding to the non-word in the to-be-processed text.

It should be understood that a manner of determining the "similarity" in operation A1 may be the same as or different from a manner of determining the "similarity" in operation A2.

When there is one candidate word corresponding to the non-word in the to-be-processed text in operation A1, operation A2 may be omitted, that is, the candidate word is directly used as the target candidate word corresponding to the non-word in the to-be-processed text.

A3. Correct the non-word in the to-be-processed text based on the target candidate word corresponding to the non-word in the to-be-processed text, to obtain the correction result of the non-word in the to-be-processed text.

The correcting the non-word in the to-be-processed text may include replacing the non-word in the to-be-processed text with the target candidate word corresponding to the non-word in the to-be-processed text, or include not correcting the non-word in the to-be-processed text, that is, not replacing the non-word in the to-be-processed text.

In some embodiments, operation A3 may be operation A31.

A31. Directly replace the non-word in the to-be-processed text with the target candidate word corresponding to the non-word in the to-be-processed text, to obtain the correction result of the non-word in the to-be-processed text.

Alternatively, operation A3 may be operation A32.

A32. Detect, by using the language model, perplexity of a text that includes the target candidate word corresponding to the non-word in the to-be-processed text, and when the perplexity is less than or equal to a first perplexity threshold, replace the non-word in the to-be-processed text with the target candidate word corresponding to the non-word in the to-be-processed text, and use the target candidate word as the correction result of the non-word in the to-be-processed text.

Further, when the perplexity is greater than the first perplexity threshold, the non-word in the to-be-processed text is not corrected. That is, the target candidate word corresponding to the non-word in the to-be-processed text is not used to replace the non-word in the to-be-processed text. In this way, time consumption can be reduced, and text error correction can be quickly implemented.

Alternatively, when the perplexity is greater than the first perplexity threshold, a candidate word with a second highest score in operation A21 may be used as a target candidate word corresponding to the non-word in the to-be-processed text, and operation A32 is repeated until a target candidate word whose perplexity meets the first perplexity threshold is obtained, and the non-word in the to-be-processed text is replaced with the target candidate word corresponding to the non-word in the to-be-processed text.

In some embodiments, the method 500 may further include operation 540. For example, operation 540 includes operation 541 to operation 543.

541. Perform real-word error detection on a real word in the to-be-processed text to obtain an incorrect real word in the to-be-processed text.

For example, real-word error detection may be performed on the real word in the to-be-processed text based on the language model, to obtain the incorrect real word in the to-be-processed text. For example, when text perplexity corresponding to a word is greater than a specified threshold, it is determined that the word is an incorrect real word.

542. Generate a candidate word corresponding to the incorrect real word.

For example, a similarity between the incorrect real word and the candidate word corresponding to the incorrect real word meets a second preset condition.

There may be one or more candidate words corresponding to the incorrect real word.

The similarity between the incorrect real word and the candidate word corresponding to the incorrect real word may include an editing distance and/or a common character string between the incorrect real word and the candidate word corresponding to the incorrect real word. That is, the candidate word corresponding to the incorrect real word may be determined based on the editing distance and/or the common character string.

For example, the candidate word corresponding to the incorrect real word may be generated by using the BK tree.

Operation 542 is described by using an example in which the similarity between the incorrect real word and the candidate word corresponding to the incorrect real word includes the editing distance between the incorrect real word and the candidate word corresponding to the incorrect real word.

The second preset condition may be that the editing distance is less than a second preset value. For example, the second preset value may be 2.

For example, the editing distance between the incorrect real word and the candidate word corresponding to the incorrect real word is limited to less than 3, and the candidate word corresponding to the incorrect real word is generated. That is, a quantity of operations in a process of generating, by using the incorrect real word, the candidate word corresponding to the incorrect real word is less than 3.

Operation 542 is described by using an example in which the similarity between the incorrect real word and the candidate word corresponding to the incorrect real word includes the editing distance and the common character string between the incorrect real word and the candidate word corresponding to the incorrect real word.

For example, the second preset condition may include a preset condition 3 and a preset condition 4. The preset condition 3 may be that the editing distance is less than a preset value. The preset condition 4 may be that a length of a longest common character string is greater than a preset length value.

For example, the candidate word corresponding to the incorrect real word may be generated by using the preset condition 3 and the preset condition 4 separately, that is, the similarity between the incorrect real word and the candidate word corresponding to the incorrect real word meets the preset condition 3 or the preset condition 4.

Alternatively, the candidate word corresponding to the incorrect real word may be generated by using the preset condition 3 and the preset condition 4 simultaneously, that is, the similarity between the incorrect real word and the candidate word corresponding to the incorrect real word meets the preset condition 3 and the preset condition 4.

For example, the editing distance between the incorrect real word and the candidate word corresponding to the incorrect real word is limited to less than 3, and a candidate word C corresponding to the incorrect real word is generated. That is, a quantity of operations in a process of generating, by using the incorrect real word, the candidate word corresponding to the incorrect real word is less than 3. The length of the longest common character string between the incorrect real word and the candidate word corresponding to the incorrect real word is limited to more than 3, and a candidate word D corresponding to the incorrect real word is generated. That is, more than three consecutive same characters are included in the candidate word corresponding to the incorrect real word and the incorrect real word. The candidate word corresponding to the incorrect real word may include the candidate word C and the candidate word D. Alternatively, the candidate word corresponding to the incorrect real word may include a same candidate word in the candidate word C and the candidate word D.

The first preset condition and the second preset condition may be the same or different. The first preset value and the second preset value may be the same or different.

It should be understood that the similarity may alternatively be a similarity in another form, for example, a character similarity. A manner of determining the similarity between the incorrect real word and the candidate word corresponding to the incorrect real word is not limited in this application.

For example, word is an incorrect real word, and candidate words corresponding to word may include: world, words, sword, and the like.

543. Determine, from the candidate words corresponding to the incorrect real word, a target candidate word corresponding to the incorrect real word.

For example, operation 543 may be: randomly determining, from the candidate words corresponding to the incorrect real word, the target candidate word corresponding to the incorrect real word.

In some embodiments, operation 543 may include operation 543*a* and operation 543*b*.

543*a*. Score, based on the similarity between the incorrect real word and the candidate word corresponding to the incorrect real word and perplexity of the candidate word corresponding to the incorrect real word, the candidate word corresponding to the incorrect real word. The perplexity of the candidate word corresponding to the incorrect real word is used to indicate a possibility that the candidate word corresponding to the incorrect real word occurs in the to-be-processed text.

For example, the similarity between the incorrect real word and the candidate word corresponding to the incorrect real word may include the editing distance between the incorrect real word and the candidate word corresponding to the incorrect real word.

The similarity between the incorrect real word and the candidate word corresponding to the incorrect real word may be scored based on the editing distance.

The perplexity of the candidate word corresponding to the incorrect real word can be scored by using the language model.

A score corresponding to each candidate word may be obtained by weighting scores corresponding to the foregoing several items, that is, a weight is set for a score corresponding to each item. The weight may be preset, or may be obtained through training.

The scoring is based on the similarity and the perplexity of the text, and the similarity between the incorrect real word and the candidate word and the semantic information of the to-be-processed text are considered. Therefore, a more accurate scoring result can be obtained.

543*b*. Determine a candidate word with a highest score among the candidate words corresponding to the incorrect real word as the target candidate word corresponding to the incorrect real word.

It should be understood that a manner of determining the "similarity" in operation 543*a* may be the same as or different from a manner of determining the "similarity" in operation 543*b*.

544. Correct the incorrect real word based on the target candidate word corresponding to the incorrect real word.

The correcting the incorrect real word may include replacing the incorrect real word with the target candidate word corresponding to the incorrect real word, or include not processing the incorrect real word, that is, not replacing the incorrect real word.

In some embodiments, operation 544 may be operation 544*a*.

544*a*. Directly replace the incorrect real word with the target candidate word corresponding to the incorrect real word, and use the target candidate word as a correction result of the incorrect real word.

Alternatively, operation 544 may be operation 544*b*.

544*b*. Detect, by using the language model, perplexity of a text including the target candidate word corresponding to the incorrect real word, and when the perplexity is less than or equal to a second perplexity threshold, replace the incorrect real word with the target candidate word corresponding to the incorrect real word, and use the target candidate word as a correction result of the incorrect real word.

The first perplexity threshold and the second perplexity threshold may be the same or may be different.

Further, when the perplexity is greater than the second perplexity threshold, the incorrect real word is not corrected. That is, the target candidate word corresponding to the incorrect real word is not used to replace the incorrect real word. In this way, time consumption can be reduced, and text error correction can be quickly implemented.

Alternatively, when the perplexity is greater than the second perplexity threshold, a candidate word with a second highest score in operation 543*a* may be used as a target candidate word corresponding to the incorrect real word, and operation 544*b* is repeated until a target candidate word whose perplexity meets the second perplexity threshold is obtained, and the incorrect real word is replaced with the target candidate word corresponding to the incorrect real word.

In this embodiment of this application, a plurality of types of characters in the to-be-processed text can be separately detected and processed. In this way, interference caused by the plurality of types of characters to an error correction process is reduced, accuracy of text error correction is improved, and robustness of the error correction method for the input text is improved.

In addition, the similarity between the candidate word and the incorrect word and the perplexity of the candidate word are used to score the candidate word, and the similarity between the incorrect word and the candidate word and the semantic information of the to-be-processed text are also considered. Therefore, an original meaning of the input text can be better fitted, a better candidate word can be obtained, and accuracy of text error correction is improved.

Figure 10:
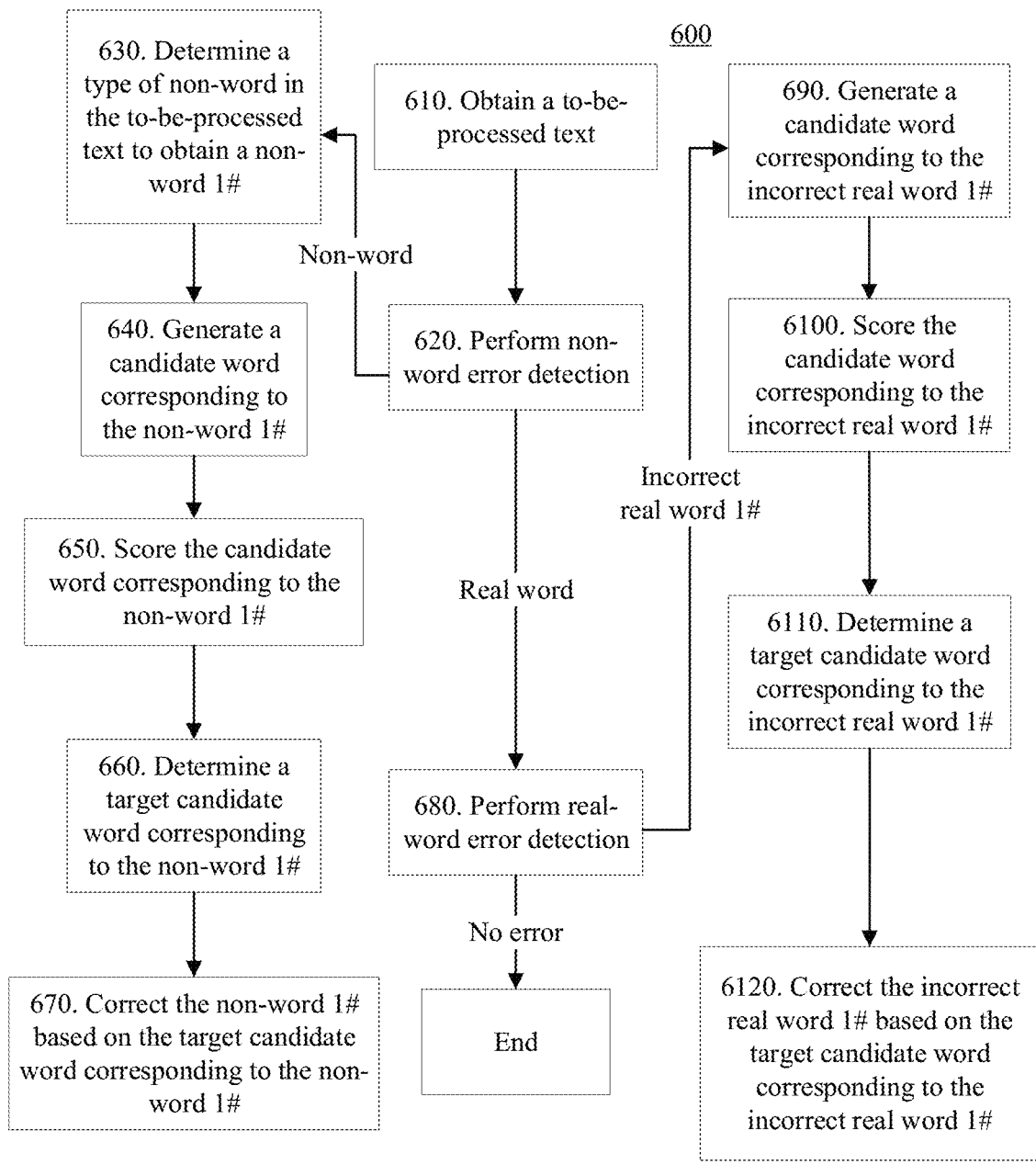
FIG. 10 is a schematic flowchart of another text processing method according to an embodiment of this application.

FIG. 10 is a schematic flowchart of a text processing method 600 according to an embodiment of this application. The method 600 is an example of a method for processing a normal type of non-word and an incorrect real word by using the method 500. The method 600 includes operation 610 to operation 6120. The following describes operation 610 to operation 6120 in detail.

610. Obtain a to-be-processed text.

620. Perform non-word error detection on the to-be-processed text. Operation 620 corresponds to operation 520 in the method 500.

For example, non-word error detection may be performed on the to-be-processed text based on an English lexicon, where the English lexicon is an example of the second preset lexicon in the method 500.

Operation 620 is used to obtain a non-word and a real word in the to-be-processed text. The non-word is a word that does not exist in the English lexicon. The real word is a word that exists in the English lexicon.

Operation 630 is performed on the non-word in the to-be-processed text. Operation 680 is performed on the real word in the to-be-processed text.

630. Determine a type of non-word in the to-be-processed text to obtain a normal type of non-word. The normal type of non-word is an example of the fourth type of non-word in the method 500.

For ease of description, the normal type of non-word is referred to as a non-word 1 #. The non-word 1 # may include one non-word or may include a plurality of non-words.

640. Generate a candidate word corresponding to the non-word 1 #. There may be one or more candidate words corresponding to the non-word 1 #.

A similarity between the non-word 1 # and the candidate word corresponding to the non-word 1 # meets a first preset condition.

For example, the candidate word corresponding to the non-word 1 # may be generated by using a BK tree. A detailed process is described in operation A1 in the method 500, and details are not described herein again.

650. Score the candidate word corresponding to the non-word 1 #.

For example, the candidate word corresponding to the non-word 1 # may be scored by using a language model and an editing distance. A detailed process is described in operation A21 in the method 500, and details are not described herein again.

660. Determine a target candidate word corresponding to the non-word 1 #.

For example, a candidate word with a highest score among the candidate words corresponding to the non-word 1 # may be determined as the target candidate word corresponding to the non-word 1 #.

When there is one candidate word corresponding to the non-word 1 #, operation 650 may be omitted, that is, the candidate word corresponding to the non-word 1 # is directly used as the target candidate word corresponding to the non-word 1 #.

670. Correct the non-word 1 # based on the target candidate word corresponding to the non-word 1 # to obtain a correction result of the non-word 1 #.

For example, perplexity of a text including the target candidate word corresponding to the non-word 1 # may be detected by using the language model, and when the perplexity is less than or equal to a first perplexity threshold, the non-word 1 # is replaced with the target candidate word corresponding to the non-word 1 #, and the target candidate word is used as a correction result of the non-word 1 #. A detailed process is described in operation A32 in the method 500.

Operation 630 to operation 670 correspond to operation 530 in the method 500.

680. Perform real-word error detection on a real word in the to-be-processed text to obtain an incorrect real word in the to-be-processed text.

For example, real-word error detection is performed on the real word in the to-be-processed text based on the language model, to obtain the incorrect real word in the to-be-processed text. For example, when text perplexity corresponding to a word is greater than a specified threshold, it is determined that the word is an incorrect real word. Operation 680 corresponds to operation 541 in the method 500.

Operation 690 is performed on the incorrect real word in the to-be-processed text. For ease of description, the incorrect real word in the processed text is referred to as an incorrect real word 1 #. The incorrect real word 1 # may include one incorrect real word or may include a plurality of incorrect real words.

690. Generate a candidate word corresponding to the incorrect real word 1 #. There may be one or more candidate words corresponding to the incorrect real word 1 #.

A similarity between the incorrect real word 1 # and the candidate word corresponding to the incorrect real word 1 # meets a second preset condition.

For example, the candidate word corresponding to the incorrect real word 1 # may be generated by using the BK tree. A detailed process is described in operation 542 in the method 500, and details are not described herein again.

6100. Score the candidate word corresponding to the incorrect real word 1 #.

For example, the candidate word corresponding to the incorrect real word 1 # may be scored by using the language model and an editing distance. A detailed process is described in operation 543*a* in the method 500, and details are not described herein again.

6110. Determine a target candidate word corresponding to the incorrect real word 1 #.

For example, a candidate word with a highest score among the candidate words corresponding to the incorrect real word 1 # is determined as the target candidate word corresponding to the incorrect real word 1 #.

When there is one candidate word corresponding to the incorrect real word 1 #, operation 6110 may be omitted, that is, the candidate word corresponding to the incorrect real word 1 # is directly used as the target candidate word corresponding to the incorrect real word 1 #.

6120. Correct the incorrect real word 1 # based on the target candidate word corresponding to the incorrect real word 1 #, to obtain a correction result of the incorrect real word 1 #.

For example, by using the language model, perplexity of a text including the target candidate word corresponding to the incorrect real word # may be detected, and when the perplexity is less than or equal to a second perplexity threshold, the incorrect real word 1 # is replaced with the target candidate word corresponding to the incorrect real word 1 #, and the target candidate word is used as the correction result of the incorrect real word 1 #. A detailed process is described in operation 544 in the method 500.

In this embodiment of this application, a normal type of non-word is obtained by determining a type of non-word, so that impact of non-words of other types on text error correction is avoided. For the normal type of non-word and an incorrect real word, a candidate word corresponding to the incorrect word is scored in a manner such as by using the language model, so that semantic information of the input text is fully used. Therefore, an original meaning of the input text can be better fitted, and accuracy of text error correction is further improved.

Figure 11:
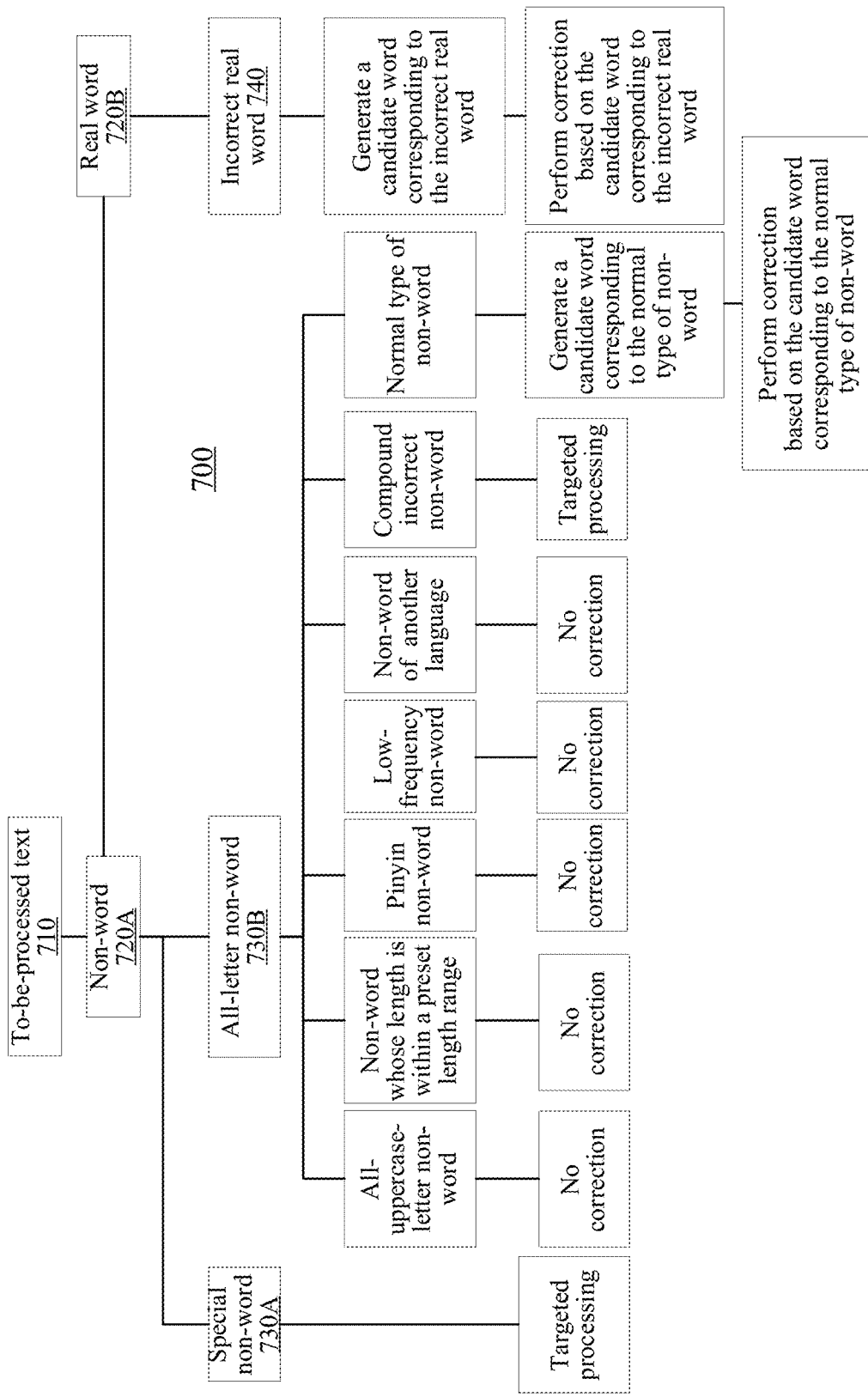
FIG. 11 is a schematic flowchart of still another text processing method according to an embodiment of this application.

FIG. 11 is a schematic flowchart of a text processing method 700 according to an embodiment of this application. The method 700 is an example of the method 500. The method 700 includes operation 710 to operation 740. The following describes operation 710 to operation 740 in detail.

710. Obtain a to-be-processed text.

Further, the method 700 may further:

Determine a length of the to-be-processed text, and perform operation 720 when the length of the to-be-processed text is greater than or equal to a preset length. The length of the to-be-processed text is a quantity of words in the to-be-processed text. For example, the preset length may be 2.

In this way, the quantity of words in the to-be-processed text is ensured, contextual semantic information can be better used, and accuracy of text error correction is improved.

720. Perform non-word error detection on the to-be-processed text based on an English lexicon. The English lexicon is an example of the second preset lexicon in the method 500. Operation 720 corresponds to operation 520 in the method 500.

Operation 720A is used to obtain a non-word and operation 720B is used to obtain a real word in the to-be-processed text. The non-word is a word that does not exist in the English lexicon. The real word is a word that exists in the English lexicon.

Operation 730 is performed on the non-word in the to-be-processed text. Operation 740 is performed on the real word in the to-be-processed text.

730. Determine a type of non-word in the to-be-processed text.

The non-word includes an all-letter non-word and a special non-word. The all-letter non-word is a non-word including 52 uppercase and lowercase English letters. The all-letter non-word may include the first type of non-word, the second type of non-word, and the fourth type of non-word in the method 500. The special non-word is a non-word including non-letter characters. The special non-word may be an example of the third type of non-word in the method 500.

For example, operation 730 can include the following steps.

Determine whether the non-word in the to-be-processed text is an all-letter non-word 730B or a special non-word 730A.

If the non-word in the to-be-processed text is a special non-word, targeted processing may be performed on the non-word. For example, a non-letter character in the non-word in the to-be-processed text is modified to a letter, and a modified word is used as a correction result of the non-word in the to-be-processed text. That is, the non-word is replaced with the modified word.

For example, a character other than a letter in the non-word in the to-be-processed text may be modified to a letter by using a preset character misjudgment lexicon, and a modified word is used as the correction result of the non-word in the to-be-processed text.

Further, the modified word may be input into a language model, and if the modified word can reduce perplexity, the modified word is used as the correction result of the non-word in the to-be-processed text.

If the non-word in the to-be-processed text is an all-letter non-word, the type of the non-word may be further determined in the all-letter non-word.

For example, uppercase and lowercase letter detection may be performed on the non-word in the to-be-processed text. If the non-word in the to-be-processed text is an all-uppercase non-word, that is, if the non-word in the to-be-processed text belongs to the first type of non-word, the non-word in the to-be-processed text is used as the correction result of the non-word in the to-be-processed text, that is, the non-word in the to-be-processed text is not processed.

For example, a length of the non-word in the to-be-processed text may be determined. If the non-word in the to-be-processed text is a non-word whose length falls within a preset length range, that is, if the non-word in the to-be-processed text belongs to the first type of non-word, the non-word in the to-be-processed text is used as the correction result of the non-word in the to-be-processed text, that is, the non-word in the to-be-processed text is not processed.

For example, it may be determined whether the non-word in the to-be-processed text belongs to a pinyin lexicon, that is, whether the non-word in the to-be-processed text belongs to a first preset lexicon. If the non-word belongs to the pinyin lexicon, the non-word may be referred to as a pinyin non-word. If the non-word in the to-be-processed text is the pinyin non-word, that is, if the non-word in the to-be-processed text belongs to the first type of non-word, the non-word in the to-be-processed text is used as the correction result of the non-word in the to-be-processed text, that is, the non-word in the to-be-processed text is not processed.

For example, it may be determined whether the non-word in the to-be-processed text belongs to a preset low-frequency lexicon, that is, whether the non-word in the to-be-processed text belongs to the first preset lexicon. The non-word belonging to the preset low-frequency lexicon may be referred to as a low-frequency non-word. If the non-word in the to-be-processed text is the low-frequency non-word, that is, if the non-word in the to-be-processed text belongs to the first type of non-word, the non-word in the to-be-processed text is used as the correction result of the non-word in the to-be-processed text, that is, the non-word in the to-be-processed text is not processed.

For example, it may be determined whether the non-word in the to-be-processed text belongs to another language lexicon, that is, whether the non-word in the to-be-processed text belongs to the first preset lexicon. The non-word belonging to the another language lexicon may be referred to as a non-word of the another language. If the non-word in the to-be-processed text is the non-word of the another language, that is, if the non-word in the to-be-processed text belongs to the first type of non-word, the non-word in the to-be-processed text is used as the correction result of the non-word in the to-be-processed text, that is, the non-word in the to-be-processed text is not processed.

For example, it may be determined whether the non-word in the to-be-processed text is a compound incorrect non-word, that is, the second type of non-word. If the non-word in the to-be-processed text belongs to the second type of non-word, targeted processing may be performed on the non-word. For example, a space is added in an appropriate position in the non-word to modify the non-word to at least two real words. Further, modified at least two real words are input into the language model, and if the modified at least two real words can reduce perplexity, the modified at least two real words are used as the correction result of the non-word in the to-be-processed text.

For example, if the non-word in the to-be-processed text does not belong to the first type of non-word, the second type of non-word, or the third type of non-word, the non-word in the to-be-processed text belongs to a normal type of non-word, that is, the fourth type of non-word in the method 500. If the non-word in the to-be-processed text belongs to the normal type of non-word, a candidate word corresponding to the non-word is generated, and the non-word is corrected based on the candidate word corresponding to the non-word. In a detailed process, the fourth type of non-word may be corrected according to operation A1 to operation A3 in the method 500.

740. Perform real-word error detection on a real word in the to-be-processed text based on the language model, to obtain an incorrect real word in the to-be-processed text. A candidate word corresponding to the incorrect real word is generated, and the incorrect real word is corrected based on the candidate word corresponding to the incorrect real word. In a detailed process, the incorrect real word may be corrected according to operation 540 in the method 500.

In this embodiment of this application, a plurality of types of characters in the to-be-processed text can be separately detected and processed. In this way, interference caused by the plurality of types of characters to an error correction process is reduced, accuracy of text error correction is improved, and robustness of the error correction method for the input text is improved.

The text processing methods in the embodiments of this application are described in detail above with reference to FIG. 1 to FIG. 11. The following describes apparatus embodiments of this application in detail with reference to FIG. 12 and FIG. 13. It should be understood that descriptions of the method embodiments correspond to descriptions of the apparatus embodiments. Therefore, for parts not described in detail, refer to the foregoing method embodiments.

Figure 12:
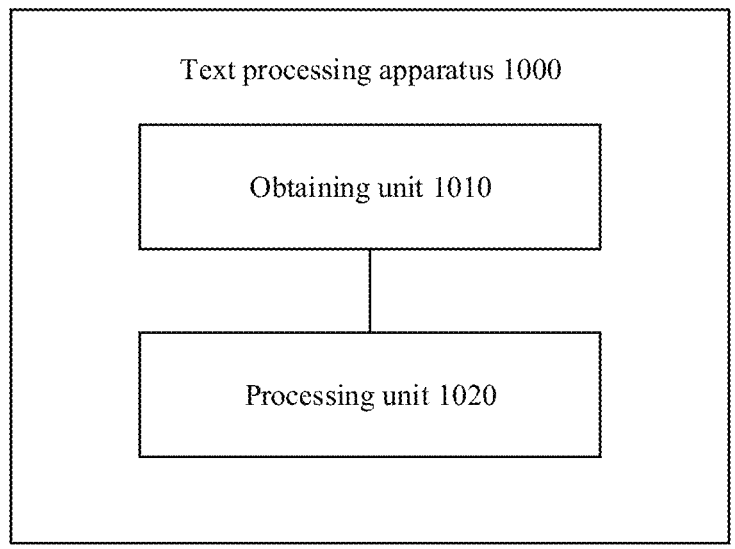
FIG. 12 is a schematic block diagram of a text processing apparatus according to an embodiment of this application.

FIG. 12 is a schematic block diagram of a text processing apparatus according to an embodiment of this application. It should be understood that the text processing apparatus 1000 may perform the text processing method shown in FIG. 9, FIG. 10, or FIG. 11. The text processing apparatus 1000 includes an obtaining unit 1010 and a processing unit 1020.

The obtaining unit 1010 is configured to obtain a to-be-processed text. The processing unit 1020 is configured to: perform error detection processing on the to-be-processed text to obtain a non-word in the to-be-processed text; and if the non-word in the to-be-processed text belongs to a first type of non-word, use the non-word in the to-be-processed text as a correction result of the non-word in the to-be-processed text; or if the non-word in the to-be-processed text belongs to a second type of non-word, a third type of non-word, or a fourth type of non-word, select a correction mode matching the type of the non-word in the to-be-processed text to correct the non-word in the to-be-processed text and obtain a correction result of the non-word in the to-be-processed text, where the first type of non-word includes an all-uppercase-letter non-word, a non-word whose length is within a preset length range, and a non-word belonging to a first preset lexicon, the second type of non-word includes a compound incorrect non-word, the third type of non-word includes a non-word including a non-letter character, and the fourth type of non-word includes non-words other than the first type of non-word, the second type of non-word, and the third type of non-word.

In some embodiments, the processing unit 1020 is configured to: if the non-word in the to-be-processed text belongs to the fourth type of non-word, generate candidate words corresponding to the non-word in the to-be-processed text; determine, from the candidate words corresponding to the non-word in the to-be-processed text, a target candidate word corresponding to the non-word in the to-be-processed text; and correct the non-word in the to-be-processed text based on the target candidate word corresponding to the non-word in the to-be-processed text, to obtain the correction result of the non-word in the to-be-processed text.

In some embodiments, the processing unit 1020 is configured to: score, based on a similarity between the non-word in the to-be-processed text and a candidate word corresponding to the non-word in the to-be-processed text and perplexity of the candidate word corresponding to the non-word in the to-be-processed text, the candidate word corresponding to the non-word in the to-be-processed text, where the perplexity of the candidate word corresponding to the non-word in the to-be-processed text is used to indicate a possibility that the candidate word corresponding to the non-word in the to-be-processed text occurs in the to-be-processed text; and determine a candidate word with a highest score among the candidate words corresponding to the non-word in the to-be-processed text as the target candidate word corresponding to the non-word in the to-be-processed text.

In some embodiments, the similarity between the non-word in the to-be-processed text and the candidate word corresponding to the non-word in the to-be-processed text meets a first preset condition.

In some embodiments, the processing unit 1020 is configured to: when perplexity of the target candidate word corresponding to the non-word in the to-be-processed text is less than or equal to a first perplexity threshold, replace the non-word in the to-be-processed text with the target candidate word corresponding to the non-word in the to-be-processed text, and use the target candidate word as the correction result of the non-word in the to-be-processed text.

In some embodiments, the compound incorrect non-word is a non-word including at least two real words; and the processing unit 1020 is configured to: if the non-word in the to-be-processed text belongs to the second type of non-word, correct the non-word in the to-be-processed text to obtain the at least two real words, and use the at least two real words as the correction result of the non-word in the to-be-processed text.

In some embodiments, the processing unit 1020 is configured to: if the non-word in the to-be-processed text belongs to the third type of non-word, modify a non-letter character in the non-word in the to-be-processed text to a letter, and use a modified word as the correction result of the non-word in the to-be-processed text.

In some embodiments, the processing unit 1020 is further configured to: perform real-word error detection on the to-be-processed text to obtain an incorrect real word in the to-be-processed text; generate candidate words corresponding to the incorrect real word; determine, from the candidate words corresponding to the incorrect real word, a target candidate word corresponding to the incorrect real word; and correct the incorrect real word based on the target candidate word corresponding to the incorrect real word.

In some embodiments, the processing unit 1020 is configured to: score, based on a similarity between the incorrect real word and a candidate word corresponding to the incorrect real word and perplexity of the candidate word corresponding to the incorrect real word, the candidate word corresponding to the incorrect real word, where the perplexity of the candidate word corresponding to the incorrect real word is used to indicate a possibility that the candidate word corresponding to the incorrect real word occurs in the to-be-processed text; and determine a candidate word with a highest score among the candidate words corresponding to the incorrect real word as the target candidate word corresponding to the incorrect real word.

In some embodiments, the similarity between the incorrect real word and the candidate word corresponding to the incorrect real word meets a second preset condition.

In some embodiments, the processing unit 1020 is configured to: when perplexity of the target candidate word corresponding to the incorrect real word is less than or equal to a second perplexity threshold, replace the incorrect real word with the target candidate word corresponding to the incorrect real word, and use the target candidate word as the correction result of the incorrect real word.

It should be noted that the text processing apparatus 1000 is embodied in a form of a functional unit. The term "unit" herein may be implemented in a form of software and/or hardware. This is not specifically limited.

For example, the "unit" may be a software program, a hardware circuit, or a combination thereof that implements the foregoing functions. The hardware circuit may include an application-specific integrated circuit (ASIC), an electronic circuit, a processor configured to execute one or more software or firmware programs (for example, a shared processor, a dedicated processor, or a group processor) and a memory, merge logic, and/or other suitable components supporting the described functions.

Therefore, units in the examples described in the embodiments disclosed in this application may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

Figure 13:
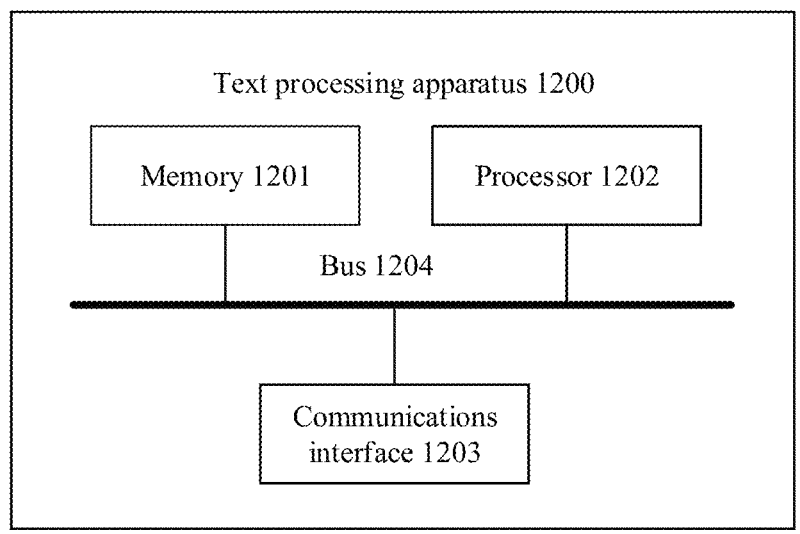
FIG. 13 is a schematic block diagram of another text processing apparatus according to an embodiment of this application.

FIG. 13 is a schematic diagram of a hardware structure of a text processing apparatus according to an embodiment of this application. The text processing apparatus 1200 shown in FIG. 13 (the text processing apparatus 1200 may be, for example, a computer device) includes a memory 1201, a processor 1202, a communications interface 1203, and a bus 1204. Communication connections are implemented between the memory 1201, the processor 1202, and the communications interface 1203 by using the bus 1204.

The memory 1201 may be a read only memory (ROM), a static storage device, a dynamic storage device, or a random access memory (RAM). The memory 1201 may store a program, and when the processor 1202 executes the program stored in the memory 1201, the processor 1202 is configured to perform each operation of the text processing method in the embodiment of this application, for example, perform operations shown in FIG. 9, FIG. 10, or FIG. 11.

It should be understood that the text processing apparatus shown in this embodiment of this application may be an intelligent terminal, or may be a chip configured in the intelligent terminal.

The text processing method disclosed in the foregoing embodiment of this application may be applied to the processor 1202, or implemented by the processor 1202. The processor 1202 may be an integrated circuit chip and has a signal processing capability. In some embodiments, operations in the foregoing text processing method can be implemented by using a hardware integrated logic circuit in the processor 1202, or by using instructions in a form of software. For example, the processor 1202 may be a chip including the NPU shown in FIG. 7.

The foregoing processor 1202 may be a central processing unit (CPU), a graphic processing unit (GPU), a digital signal processor (DSP), an application-specific integrated circuit (ASIC), a field programmable gate array (FPGA) or another programmable logic device, a discrete gate or transistor logic device, or a discrete hardware component. It may implement or perform the methods, the operations, and logical block diagrams that are disclosed in the embodiments of this application. The general purpose processor may be a microprocessor, or the processor may be any conventional processor or the like. Operations of the methods disclosed with reference to the embodiments of this application may be directly executed and accomplished by a hardware decoding processor, or may be executed and accomplished by using a combination of hardware and software modules in the decoding processor. A software module may be located in a mature storage medium in the art, such as a random access memory (RAM), a flash memory, a read-only memory (ROM), a programmable read-only memory, an electrically erasable programmable memory, a register, or the like. The storage medium is located in the memory 1201. The processor 1202 reads information in the memory 1201, and implements, in combination with hardware of the processor 1202, a function that may be performed by the unit included in the text processing apparatus shown in FIG. 12 in the embodiment of this application, or performs the text processing method shown in FIG. 9, FIG. 10, or FIG. 11 in the method embodiment of this application.

The communications interface 1203 uses a transceiver apparatus such as but not limited to a transceiver to implement communication between the apparatus 1200 and another device or a communications network.

The bus 1204 may include a channel through which various components of the text processing apparatus 1200 (for example, the memory 1201, the processor 1202, and the communications interface 1203) transmit information.

It should be noted that although only the memory, the processor, and the communications interface in the text processing apparatus 1200 are illustrated, in some embodiments, a person skilled in the art should understand that the text processing apparatus 1200 may further include another component utilized for normal running. In addition, a person skilled in the art should understand that the text processing apparatus 1200 may further include hardware components for implementing other additional functions according to some embodiments. In addition, a person skilled in the art should understand that the text processing apparatus 1200 may include only components required for implementing this embodiment of this application, but does not need to include all components shown in FIG. 13.

An embodiment of this application further provides a chip. The chip includes a transceiver unit and a processing unit. The transceiver unit may be an input/output circuit or a communications interface. The processing unit is a processor, a microprocessor, or an integrated circuit integrated on the chip. The chip may perform the method in the foregoing method embodiment.

An embodiment of this application further provides a computer readable storage medium. The computer readable storage medium stores an instruction. When the instruction is executed, the method in the foregoing method embodiment is performed.

An embodiment of this application further provides a computer program product including an instruction. When the instruction is executed, the method in the foregoing method embodiment is performed.

It should also be understood that in the embodiments of this application, the memory may include a read-only memory and a random access memory, and provide an instruction and data to the processor. A part of the processor may further include a non-volatile random access memory. For example, the processor may further store information of a device type.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the embodiments of this application.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the embodiment goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional modules in the embodiments of this application may be integrated into one processing unit, or each of the units may exist alone physically, or two or more units are integrated into one unit.

When the functions are implemented in the form of a software functional unit and sold or used as an independent product, the functions may be stored in a computer readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the operations of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A text processing method, comprising:
obtaining a to-be-processed text;
performing error detection processing on the to-be-processed text to obtain a non-word in the to-be-processed text;
responsive to a type of the non-word in the to-be-processed text belonging to a first type of non-word, using the non-word in the to-be-processed text as a correction result of the non-word in the to-be-processed text;
responsive to the type of the non-word in the to-be-processed text belonging to a second type of non-word, correcting the non-word in the to-be-processed text to obtain at least two real words, and using the at least two real words as a correction result of the non-word in the to-be-processed text;
responsive to the type of the non-word in the to-be-processed text belonging to a third type of non-word, modifying a non-letter character in the non-word in the to-be-processed text to a letter of an English lexicon, and using a modified word as a correction result of the non-word in the to-be-processed text;
responsive to the type of the non-word in the to-be-processed text belonging to a fourth type of non-word, generating candidate words corresponding to the non-word in the to-be-processed text based on an editing distance and a common character string between the non-word in the to-be-processed text and the candidate words; and
scoring, based on a similarity between the non-word in the to-be-processed text and a candidate word corresponding to the non-word in the to-be-processed text and a perplexity of the candidate word corresponding to the non-word in the to-be-processed text, wherein the perplexity of the candidate word corresponding to the non-word in the to-be-processed text is used to indicate a possibility that the candidate word corresponding to the non-word in the to-be-processed text occurs in the to-be-processed text, wherein
the first type of non-word comprises at least one of an all-uppercase-letter non-word, a non-word whose length is within a preset length range, or a non-word belonging to a first preset lexicon, the second type of non-word comprises a compound incorrect non-word, the third type of non-word comprises a non-word comprising the non-letter character, and the fourth type of non-word comprises non-words other than the first type of non-word, the second type of non-word, and the third type of non-word.

2. The method according to claim 1, further comprising:
responsive to the type of the non-word in the to-be-processed text belonging to the fourth type of non-word,
determining, from the candidate words corresponding to the non-word in the to-be-processed text, a target candidate word corresponding to the non-word in the to-be-processed text; and
correcting the non-word in the to-be-processed text based on the target candidate word corresponding to the non-word in the to-be-processed text, to obtain a correction result of the non-word in the to-be-processed text.

3. The method according to claim 2, wherein the correcting the non-word in the to-be-processed text based on the target candidate word corresponding to the non-word in the to-be-processed text, to obtain the correction result of the non-word in the to-be-processed text comprises:
responsive to a perplexity of the target candidate word corresponding to the non-word in the to-be-processed text being less than or equal to a first perplexity threshold, replacing the non-word in the to-be-processed text with the target candidate word corresponding to the non-word in the to-be-processed text, and using the target candidate word as the correction result of the non-word in the to-be-processed text.

4. The method according to claim 2, wherein the determining, from the candidate words corresponding to the non-word in the to-be-processed text, the target candidate word corresponding to the non-word in the to-be-processed text comprises:

determining a candidate word with a highest score among the candidate words corresponding to the non-word in the to-be-processed text as the target candidate word corresponding to the non-word in the to-be-processed text.

5. The method according to claim 4, wherein the similarity between the non-word in the to-be-processed text and the candidate word corresponding to the non-word in the to-be-processed text meets a first preset condition.

6. The method according to claim 1, wherein the compound incorrect non-word is a non-word comprising the at least two real words.

7. The method according to claim 1, wherein the method further comprises:

performing real-word error detection on the to-be-processed text to obtain an incorrect real word in the to-be-processed text;

generating candidate words corresponding to the incorrect real word;

determining, from the candidate words corresponding to the incorrect real word, a target candidate word corresponding to the incorrect real word; and correcting the incorrect real word based on the target candidate word corresponding to the incorrect real word, to obtain a correction result of the incorrect real word.

8. The method according to claim 7, wherein the correcting the incorrect real word based on the target candidate word corresponding to the incorrect real word, to obtain the correction result of the incorrect real word comprises:

responsive to a perplexity of the target candidate word corresponding to the incorrect real word being less than or equal to a second perplexity threshold, replacing the incorrect real word with the target candidate word corresponding to the incorrect real word, and using the target candidate word as the correction result of the incorrect real word.

9. The method according to claim 7, wherein the determining, from the candidate words corresponding to the incorrect real word, the target candidate word corresponding to the incorrect real word comprises:

determining a candidate word with a highest score among the candidate words corresponding to the incorrect real word as the target candidate word corresponding to the incorrect real word.

10. The method according to claim 9, wherein the similarity between the incorrect real word and the candidate word corresponding to the incorrect real word meets a second preset condition.

11. A text processing apparatus, comprising:

a memory, configured to store a program; and a processor, configured to execute the program stored in the memory, wherein when the processor executes the program stored in the memory, the processor is configured to perform operations comprising:

obtaining a to-be-processed text;

performing error detection processing on the to-be-processed text to obtain a non-word in the to-be-processed text;

responsive to a type of the non-word in the to-be-processed text belonging to a first type of non-word, using the non-word in the to-be-processed text as a correction result of the non-word in the to-be-processed text;

responsive to the type of the non-word in the to-be-processed text belonging to a second type of non-word, correcting the non-word in the to-be-processed text to obtain at least two real words, and using the at least two real words as a correction result of the non-word in the to-be-processed text;

responsive to the type of the non-word in the to-be-processed text belonging to a third type of non-word, modifying a non-letter character in the non-word in the to-be-processed text to a letter of an English lexicon, and using a modified word as a correction result of the non-word in the to-be-processed text;

responsive to the type of the non-word in the to-be-processed text belonging to a fourth type of non-word, generating candidate words corresponding to the non-word in the to-be-processed text based on an editing distance and a common character string between the non-word in the to-be-processed text and the candidate words; and scoring, based on a similarity between the non-word in the to-be-processed text and a candidate word corresponding to the non-word in the to-be-processed text and a perplexity of the candidate word corresponding to the non-word in the to-be-processed text, wherein the perplexity of the candidate word corresponding to the non-word in the to-be-processed text is used to indicate a possibility that the candidate word corresponding to the non-word in the to-be-processed text occurs in the to-be-processed text, wherein the first type of non-word comprises at least one of an all-uppercase-letter non-word, a non-word whose length is within a preset length range, or a non-word belonging to a first preset lexicon, the second type of non-word comprises a compound incorrect non-word, the third type of non-word comprises a non-word comprising the non-letter character, and the fourth type of non-word comprises non-words other than the first type of non-word, the second type of non-word, and the third type of non-word.

12. The apparatus according to claim 6, further comprising:

responsive to the type of the non-word in the to-be-processed text belonging to the fourth type of non-word, determining, from the candidate words corresponding to the non-word in the to-be-processed text, a target candidate word corresponding to the non-word in the to-be-processed text; and correcting the non-word in the to-be-processed text based on the target candidate word corresponding to the non-word in the to-be-processed text, to obtain a correction result of the non-word in the to-be-processed text.

13. The apparatus according to claim 12, wherein the correcting the non-word in the to-be-processed text based on the target candidate word corresponding to the non-word in the to-be-processed text, to obtain the correction result of the non-word in the to-be-processed text comprises:

responsive to a perplexity of the target candidate word corresponding to the non-word in the to-be-processed text being less than or equal to a first perplexity threshold, replacing the non-word in the to-be-processed text with the target candidate word corresponding to the non-word in the to-be-processed text, and using the target candidate word as the correction result of the non-word in the to-be-processed text.

14. The apparatus according to claim 12, wherein the determining, from the candidate words corresponding to the non-word in the to-be-processed text, the target candidate word corresponding to the non-word in the to-be-processed text comprises:

determining a candidate word with a highest score among the candidate words corresponding to the non-word in the to-be-processed text as the target candidate word corresponding to the non-word in the to-be-processed text.

15. The apparatus according to claim 14, wherein the similarity between the non-word in the to-be-processed text and the candidate word corresponding to the non-word in the to-be-processed text meets a first preset condition.

16. The apparatus according to claim 11, wherein the compound incorrect non-word is a non-word comprising the at least two real words.

17. The apparatus according to claim 11, wherein the operations further comprise:

performing real-word error detection on the to-be-processed text to obtain an incorrect real word in the to-be-processed text;

generating candidate words corresponding to the incorrect real word;

determining, from the candidate words corresponding to the incorrect real word, a target candidate word corresponding to the incorrect real word; and correcting the incorrect real word based on the target candidate word corresponding to the incorrect real word, to obtain a correction result of the incorrect real word.

18. A non-transitory computer readable storage medium, wherein the computer readable storage medium stores a program instruction, and when the program instruction is run by a processor, to perform operations comprising:

obtaining a to-be-processed text;

performing error detection processing on the to-be-processed text to obtain a non-word in the to-be-processed text;

responsive to a type of the non-word in the to-be-processed text belonging to a first type of non-word, using the non-word in the to-be-processed text as a correction result of the non-word in the to-be-processed text;

responsive to the type of the non-word in the to-be-processed text belonging to a second type of non-word, correcting the non-word in the to-be-processed text to obtain at least two real words, and using the at least two real words as a correction result of the non-word in the to-be-processed text;

responsive to the type of the non-word in the to-be-processed text belonging to a third type of non-word, modifying a non-letter character in the non-word in the to-be-processed text to a letter of an English lexicon, and using a modified word as a correction result of the non-word in the to-be-processed text;

responsive to the type of the non-word in the to-be-processed text belonging to a fourth type of non-word, generating candidate words corresponding to the non-word in the to-be-processed text based on an editing distance and a common character string between the non-word in the to-be-processed text and the candidate words; and scoring, based on a similarity between the non-word in the to-be-processed text and a candidate word corresponding to the non-word in the to-be-processed text and a perplexity of the candidate word corresponding to the non-word in the to-be-processed text, wherein the perplexity of the candidate word corresponding to the non-word in the to-be-processed text is used to indicate a possibility that the candidate word corresponding to the non-word in the to-be-processed text occurs in the to-be-processed text, wherein the first type of non-word comprises at least one of an all-uppercase-letter non-word, a non-word whose length is within a preset length range, or a non-word belonging to a first preset lexicon, the second type of non-word comprises a compound incorrect non-word, the third type of non-word comprises a non-word comprising the non-letter character, and the fourth type of non-word comprises non-words other than the first type of non-word, the second type of non-word, and the third type of non-word.

* * * * *

UNITED STATES PATENT AND TRADEMARK OFFICE
CERTIFICATE OF CORRECTION

PATENT NO. : 12,299,392 B2
APPLICATION NO. : 17/788052
DATED : May 13, 2025
INVENTOR(S) : Jie Liu and Guanwen Zhu Page 1 of 1

It is certified that error appears in the above-identified patent and that said Letters Patent is hereby corrected as shown below:

In the Claims

In Column 40, Claim 12, Line 41, delete "according to claim 6" and insert --according to claim 11--.

Signed and Sealed this
Twelfth Day of August, 2025

Coke Morgan Stewart
*Acting Director of the United States Patent and Trademark Office*